US006633659B1

(12) United States Patent
Zhou

(10) Patent No.: US 6,633,659 B1
(45) Date of Patent: Oct. 14, 2003

(54) SYSTEM AND METHOD FOR AUTOMATICALLY ANALYZING GENE EXPRESSION SPOTS IN A MICROARRAY

(75) Inventor: Yi-Xiong Zhou, Los Angeles, CA (US)

(73) Assignee: BioDiscovery, Inc., Los Angeles, CA (US)

(*) Notice: Subject to any disclaimer, the term of this patent is extended or adjusted under 35 U.S.C. 154(b) by 0 days.

(21) Appl. No.: 09/416,576

(22) Filed: Oct. 12, 1999

Related U.S. Application Data
(60) Provisional application No. 60/157,099, filed on Sep. 30, 1999.

(51) Int. Cl.[7] .............................................. G06K 9/00
(52) U.S. Cl. ............................. 382/129; 435/6; 702/21
(58) Field of Search ................................. 382/128, 129, 382/130, 131, 132, 133, 134, 168, 171, 173, 159; 600/306, 117, 178, 407, 473; 435/4, 6, 41, 441; 436/94, 501; 702/19, 20, 27

(56) References Cited

PUBLICATIONS

Chen, Dougherty, Bittner, *Biomidical Optics*, "Ratio–Based Decisions and the Quantitative Analysis of cDNA Microarray Images" (Oct. 1997). pp. 364–374.

Schena, Shalon, Davis, Brown, *Science*, "Quantitative Monitoring of Gene Expression Patterns with a Complementary DNA Microarray" (Oct. 20, 1995), vol. 270, pp. 467–470.

Schena, *BioEssays*, "Genome analysis with gene exrpession microarrays," (Jan. 3, 1996), vol. 18 No. 5, pp. 427–431.

Lemieux, Aharoni, and Schena, *Molecular Breeding*, "Overview of DNA chip technology," (1998), pp. 277–289.

Schena, Heller, Theriault, Konrad, Lachenmeier, Davis, *Tibtech*, "Microarrays: biotechnology's discovery platform for functional genomics,"(Jul. 1998), vol. 16, pp. 301–306.

Schena, Shalon, Heller, Chai, Brown, Davis, *Biochemistry*, "Parallel human genome analysis: Microarray–based expression monitoring of 1000 genes," (Oct. 1996), vol. 93, pp. 10614–10619.

Heller, Schena, Chai, Shalon, Bedilion, Gilmore, Woolley, Davis, *Biochemistry*, "Discovery and analysis of inflammatory disease–related genes using cDNA microarrays," (Mar. 1997), vol. 94, pp. 2150–2155.

(List continued on next page.)

*Primary Examiner*—Jayanti K. Patel
*Assistant Examiner*—Abolfazl Tabatabai
(74) *Attorney, Agent, or Firm*—Tope-McKay & Associates

(57) ABSTRACT

A digital image processing-based system and method are disclosed for quantitatively assessing nucleic acid species expressed in a microarray. The microarray is a grid of a plurality of sub-grids of the nucleic acid species. The system includes a scanner that has a digital scanning sensor that scans the microarray and transmits from an output a digital image of the microarray, and a computer that receives the digital image of the microarray from the scanner and then processes the digital image, detecting an expression signal of the nucleic acid species, segmenting the expression signal, calculating a measure of the segmented expression signal, and providing the measure at the output of the computer. Prior to segmenting the expression signal for a nucleic acid species, the expression signal is characterized by a center pixel in the digital image and an approximate radius around the center pixel. The computer segments the expression signal by (a) tentatively classifying pixels within the approximate radius as signal pixels and those outside the approximate radius as background pixels, (b) determining major intensity modes for the signal pixels and for the background pixels, and (c) using the major intensity modes, reclassifying the signal and background pixels depending on each pixel's intensity relative to the major intensity modes.

62 Claims, 14 Drawing Sheets

OTHER PUBLICATIONS

Schena, Davis, *PCR Methods Manual*, "Parallel Analysis with Biological Chips," pp. 445–455, (admitted as prior art).

Schena, Davis, *DNA Microarray Protocols*, (admitted as prior art).

ArrayIt, *Chip Maker 2 Handbook*, "Micro–Spotting Device For a Broad Range of Microarray Manufacturing Applications," (Jun. 1, 1998).

ArrayIt, *Chip Maker 3 Handbook*, "Micro–Spotting Device For a Broad Range of Microarray Manufacturing Applications," (Dec. 8, 1998).

ArrayIt, *96 & 384 Well PCR Purification Kits*, "High through put purification of PCR products for DNA microarrays, sequencing and other applications in genomics," (admitted as prior art).

ArrayIt, *Hybridization Cassette Handbook*, "Designed for hybidization reactions involving nucleic acid microarray biochips," (1998).

ArrayIt, *Micro–Spotting Solution (2X) Handbook*, "Advanced polymeric mixture designed to increase the quality of microarray biochip fabrication by improving the surface properties of the DNA micro–spotting technologies," (1998).

ArrayIt, *UniHyb Hybridization Solution Handbook*, "An Advanced mixture of salts, detergents and buffering compenents . . . ," (1998).

ArrayIt, *Dye Terminator Clean–Up Kits Handbook*, (1998).

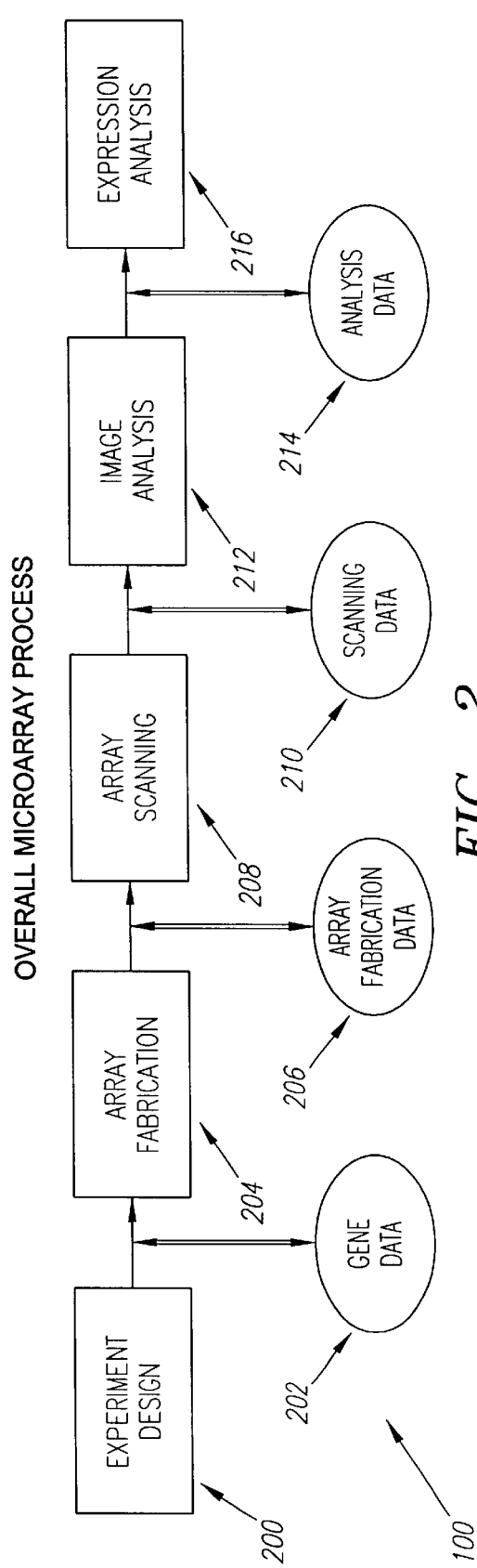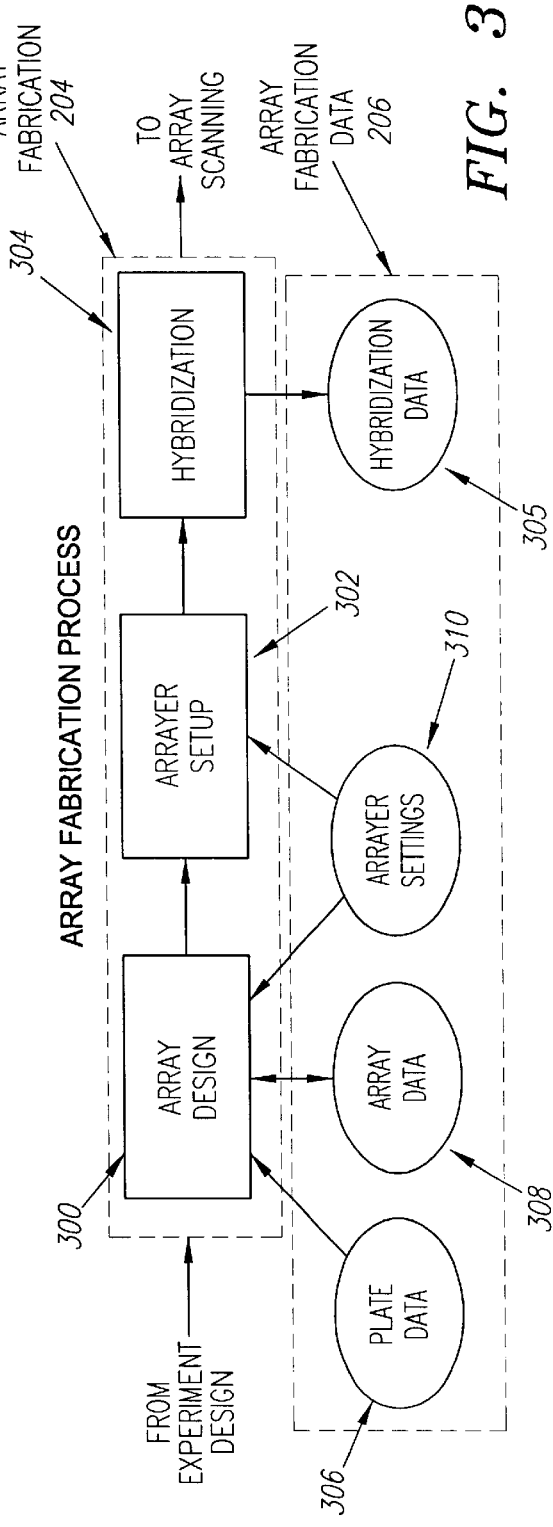

SYSTEM AND METHOD FOR AUTOMATICALLY ANALYZING GENE EXPRESSION SPOTS IN A MICROARRAY

This application claims priority to U.S. Provisional Application Serial No. 60/157,099 filed Sep. 30, 1999 and having the same title and inventorship as the present application.

BACKGROUND OF THE INVENTION

The field of the present invention relates to the image processing of gene expression microarrays. In particular, the invention relates to automatically identifying detected gene expression spots in a microarray.

A cell relies on proteins for a variety of its functions. Producing energy, biosynthesizing all component macromolecules, maintaining cellular architecture, and acting upon intra- and extracellular stimuli are all protein dependent activities. Almost every cell within an organism contains the information necessary to produce the entire repertoire of proteins that that organism can specify. This information is stored as genes within the organism's DNA genome. Different organisms have different numbers of genes to define them. The number of human genes, for example, is estimated to be between 30,000 and 100,000.

Only a portion of the genome is composed of genes, and the set of genes expressed as proteins varies between cell types. Some of the proteins present in a single cell are likely to be present in all cells because they serve functions required in every type of cell. These proteins can be thought of as "housekeeping" proteins. Other proteins serve specialized functions that are only required in particular cell types. Such proteins are generally produced only in limited types of cells. Given that a large part of a cell's specific functionality is determined by the genes that it is expressing, it is logical that transcription, the first step in the process of converting the genetic information stored in an organism's genome into protein, would be highly regulated by the control network that coordinates and directs cellular activity.

The regulation of transcription is readily observed in studies that scrutinize activities evident in cells configuring themselves for a particular function (specialization into a muscle cell) or state (active multiplication or quiescence). As cells alter their state, coordinate transcription of the protein sets required for the change of state can be observed. As a window both on cell status and on the system controlling the cell, detailed, global knowledge of the transcriptional state could provide a broad spectrum of information useful to biologists. For instance, knowledge of when and in what types of cell the protein product of a gene of unknown function is expressed would provide useful clues as to the likely function of that gene. Furthermore, determining gene expression patterns in normal cells could provide detailed knowledge of how the control system achieves the highly coordinated activation and deactivation required to develop and differentiate a single fertilized egg into a mature organism. Also, comparing gene expression patterns in normal and pathological cells could provide useful diagnostic "fingerprints" and help identify aberrant functions that would be reasonable targets for therapeutic intervention.

The ability to perform studies that determine the transcriptional state of a large number of genes has, however, until recently, been severely inhibited by limitations on the ability to survey cells for the presence and abundance of a large number of gene transcripts in a single experiment. A primary limitation has been the small number of identified genes. In humans, only a few thousand of the complete set have been physically purified and characterized to any extent. Another significant limitation has been the cumbersome nature of transcription analysis. Even a large experiment on human cells can track expression of only a dozen genes, clearly an inadequate sampling to make any meaningful inferences about so complex a control system.

Two recent technological advances have provided the means to overcome some of these limitations in examining the patterns and relationships in gene transcription. The cloning of molecules derived from MRNA transcripts in particular tissues, followed by the application of high-throughput sequencing to the DNA ends of the members of these libraries has yielded a catalog of expressed sequence tags (ESTs). M. S. Boguski and G. D. Schuler, "Establishing a Human Transcript Map," *Nature Genetics* 10(4), 369–371 (1995). These signature sequences provide unambiguous identifiers for a large cohort of genes. At present, approximately 40,000 human genes have been "tagged" by this route, and many have been mapped to their genomic location. G. D. Schuler, M. S. Boguski, et al., "A Gene Map of the Human Genome," *Science* 274(5287), 540–546 (1996).

In addition, the clones from which these sequences were derived provide analytical reagents that can be used in the quantitation of transcripts from biological samples. Specifically, the nucleic acid polymers, DNA and RNA, are biologically synthesized in a copying reaction in which one polymer serves as a template for the synthesis of an opposing strand, which is termed its complement. Even after separation from each other, these strands can be induced to pair quite specifically with each other to form a very tight molecular complex in a process called hybridization. This specific binding is the basis of most analytical procedures for quantitating the presence of a particular species of nucleic acid, such as the mRNA specifying a particular protein gene product.

Furthermore, the recent development of microarray technology, a hybridization-based process, has begun to enable the simultaneous quantitation of many nucleic acid species, even genome-wide quantitation. M. Schena, D. Shalon, R. W. Davis, and P. O. Brown, "Quantitative Monitoring of Gene Expression Patterns With a Complementary DNA Microarray," *Science* 270(5235), 467–470, (1995), J. DeRisi, L. Penland, P. O. Brown, M. L. Bittner, P. S. Meltzer, M. Ray, Y. Chen, Y. A. Su, and J. M. Trent, "Use of a cDNA Microarray to Analyze Gene Expression Patterns in Human Cancer," *Nature Genetics* 14(4), 457–460 (1996), M. Schena, D. Shalon, R. Heller, A. Chai, P. O. Brown, and R. W. Davis, "Parallel Human Genome Analysis: Microarray-based Expression Monitoring of 1000 Genes," *Proc. Nat. Acad. Sci. U.S.A.*93(20), 10614–10619 (1996). For mRNA expression studies, the goal is to develop microarrays that contain every gene in a genome against which mRNA expression levels can be quantitatively assessed. This technology combines robotic placement (spotting) of small amounts of individual, pure nucleic acid species on a glass slide, hybridization to this array with multiple fluorescently labeled nucleic acids, and traditionally, detection and quantitation of the resulting fluor-tagged hybrids with a scanning confocal fluorescent microscope. When used to detect transcripts, a particular RNA transcript (an mRNA) is copied into DNA (a cDNA) and this copied form of the transcript is immobilized on a glass slide. The entire complement of transcript mRNAs present in a particular cell type is extracted from cells and then a fluor-tagged cDNA representation of the extracted mRNAs is made in vitro by an enzymatic reaction termed reverse transcription. Fluor-tagged representations of mRNA from several cell types, each tagged with a fluor emitting a different color light, are hybridized to the array of cDNAs and then fluorescence at the site of each immobilized cDNA is quantitated.

The various characteristics of this analytic method make it particularly useful for directly comparing the abundance of mRNAs present in two cell types. An example of such a system is presented in FIG. 1. In this experiment, an array of cDNAs was hybridized with a green fluor-tagged collection of mRNAs extracted from a tumorigenic melanoma cell line (UACC-903) and a red fluor-tagged collection of mRNAs was extracted from a nontumorigenic derivative of the original cell line (UACC-903+6). J. DeRisi, L. Penland, P. O. Brown, M. L. Bittner, P. S. Meltzer, M. Ray, Y. Chen, Y. A. Su, and J. M. Trent, "Use of a cDNA Microarray to Analyze Gene Expression Patterns in Human Cancer," *Nature Genetics* 14(4), 457–460 (1996). Monochrome images of the fluorescent intensity observed for each of the fluors are then combined by placing each image in the appropriate color channel of a red-green-blue (RGB) image. Intense red fluorescence at a spot indicates a high level of expression of that gene in the nontumorigenic cell line, with little expression of the same in the tumorigenic parent. Conversely, intense green fluorescence at a spot indicates high expression of that gene in the tumorigenic line, with little expression in the nontumorigenic daughter line. When both cell lines express a gene at similar levels, the observed array spot is yellow.

Visual inspection of the results with, for example, a scanning microscope, is adequate to analyze genes where there is a very large differential rate of expression. A more thorough study of the changes in expression requires the ability to discern more subtle changes in expression level and to determine whether observed differences are the result of random variation or whether they are characteristic of the gene being expressed. For this level of analysis, a visual inspection-based methodology is generally inadequate.

Moreover, advances in microarray technology have made using a visual inspection-based methodology even more impractical. Microarray generation systems are in place to produce over 10,000 spots on a single microscope slide. A hybridization experiment using one such slide yields an expression profile of thousands of genes. Thus, these systems produce massive amounts of information. The massive output of data makes possible high-throughput gene expression analysis at an acceptable cost and enables a more efficient study of the interaction and interrelationships of thousands of genes. If the information can be efficiently processed and analyzed, the results can potentially yield a complete understanding of the genomic functions in biological systems. Using visual inspection to quantitate the expression levels, however, is far too cumbersome, time-consuming and imprecise to effectively analyze these data-rich slides. Thus, along with the opportunities created by the rapid advancement in microarray generation technology, a management of information or "informatics" problem has arisen.

The application of digital image processing technology has largely been adopted as the avenue for solving the informatics problem. Using digital image processing, images of the microarray slides are digitally captured and analyzed using a high-speed computer. A typical microarray image depicts bright spots arranged in sets of sub-grids against a dark background. Typically, the sub-grids in a microarray image have the same number of rows and columns of spots. Normally, the sub-grids in a microarray image are arranged as a grid of sub-grids, or "meta-grid."

Theoretically, processing a microarray image containing a meta-grid of spots is straightforward. First, the individual sub-grids in the meta-grid are detected. Then, for each detected sub-grid, the spots in the sub-grid are detected. Once the spots are located, their intensities reflecting the gene expression levels are measured. Finally, the reliability of the measurements for each spot and each sub-grid is assessed. Under ideal conditions, a microarray image is easily processed. These ideal conditions require that 1) the sub-grids within a meta-grid have the same dimensions, 2) the sub-grids be positioned in a predetermined location within a microarray image, 3) the sub-grids be equally spaced from each other, 4) rows and columns within a sub-grid be equally spaced from each other, 5) the spots be centered on sub-grid-line intersections, 6) the spots be of the same size and shape, 7) the spots have intensities distinguishable from the background, and 8) the slides have no contamination that appears in the microarray images. A simple software program can process a microarray image having the above "ideal" characteristics.

However, because of inherent limitations in the microarray generation hardware and process, the microarray images rarely, if ever, exhibit these conditions. For example, the pins for generating the spots in the array during the spotting process can be misaligned. Also, the spatial mapping between the slides and the scanned images can be offset. The result of these hardware imperfections is that the location of each grid in the microarray can vary from image to image and the spots will not be linearly aligned such that they are centered on grid-line intersections. Furthermore, some spots will appear to be missing from a sub-grid entirely because of gene expression levels that are too low to be measurable.

Besides the positioning inconsistencies, the shapes and sizes of the spots vary significantly. Such variations are again due to limitations in the spotting hardware and process. In particular, the sizes of the droplets of DNA solution vary, causing the sizes of the spots to vary. Second, the concentrations of DNA and salt in the spotting solution vary over time. Consequently, the shapes of the spots will deviate over time from a circle as the density of DNA varies within a spot. Furthermore, the contact space between the tips of the pins and the slide surface varies, as do surface properties of the slide. All of the above factors perturb the shapes and sizes of the spots.

Other factors can affect the quality of the microarray image data that is generated. During the spotting process, temperature nonuniformities across a slide or between slides, and accidental scrapes by pins during the spotting process can alter the results. Another issue that causes a microarray image to deviate from ideal conditions is contamination of the slide surface. For example, dust landing on the slides during the hybridization process can produce high-intensity pixels in the microarray image. In the slide-drying process, small bumps on the slide surface can appear as specular reflections in the microarray image. Another potential source of contamination is from accidental splashes and drips of DNA solution from the spotting pins. Thus, in any meaningful processing of a microarray image, the above factors should be accounted for and considered.

Because of these issues, previous image processing techniques for automatically processing and analyzing microarray images have been impractical. The methods used to automatically extract microarray data through digital image processing are normally classified into two groups: signal detection and signal analysis. Signal detection methods attempt to locate the spots in the microarray images. One of the early image processing-based methodologies used computer-based tools that allowed a user to direct the image processor to spot locations in the microarray images. A user applied a grid frame to an image and then resized the frame to fit the grid of spots in the image. When the spots in the image were not evenly spaced, the user would adjust the grid frame lines to align them with the spots in the image. This method, however, was prohibitively time-consuming and labor intensive for microarray images, particularly where precise grid alignment was needed before proceeding to a measurement phase for the spot signal.

Another image processing-based signal detection method automatically establishes grid lines after a user has identified the approximate location of a grid of spots in a microarray image. The user, for example, specifies the location of the four corners of the grid in the image. The spot finding method then locates the spots near the calculated grid points. The obvious problem with this method is that human involvement is still required, making analyzing large microarrays prohibitively expensive.

Thus, a need exists for a system and method of automatically locating sub-grids of gene expression signals in a microarray that account for the inherent inconsistencies and errors in the microarray generation process and that do not necessitate the expense of human involvement.

Once the sub-grids in the microarray are identified, the signal analysis methods take over. In signal analysis, the gene expression spots in each sub-grid are detected and characterized. A number of signal analysis methods have been applied to extract or "segment" the gene expression signals from the spots. In a space-based signal segmentation method, for example, a circle of a predetermined size and having a location based on the most likely position of the spot signal is placed in the image to separate signal pixels from background pixels. Signal measurements are made based on the assumption that signal pixels reside inside the circle, while background pixels reside outside the circle. However, because of the high potential for microarray contamination and spot shape and location irregularity, the space-based signal segmentation method is inadequate.

Pure intensity-based signal segmentation methods have also been ineffective at obtaining accurate signal measurements for the gene expression spots. These methods use pixel intensity information to extract the signal pixels. In these methods, it is assumed that the gene expression signal pixels have intensities that are brighter than the background pixels. While being simple and fast computing, these methods have significant disadvantages. First, gene expression levels that are low will likely not be adequately characterized because the signal and background pixels cannot be separated based on intensity alone. Also, microarray images with contamination or noise are easily mischaracterized because the signal and background are not easily separated based on pixel intensity because both exhibit strong signals.

To enhance segmentation performance, methods that incorporate space and signal intensity information have been developed. In a Journal of Biomedical Optics article dated October 1997 by Yindong Chen et al. entitled *Ratio—Based Decsions and the Quantitative Analysis of cDNA Microarray Images*, a pixel selection method based on the Mann-Whitney test was proposed. In the method, a circle is placed in a target region that includes the region of the spot. Outside the circle, statistical properties of the assumed-to-be-background pixels are calculated. From these calculations, a threshold level is calculated to determine which pixels inside the circle are signal and which are background pixels. A problem with the method occurs when contamination is observed inside the circle whereby contamination pixels are probably classified as signal pixels. Correspondingly, contamination pixels outside the circle cause the calculated threshold level to be higher that it otherwise would be. The method also performs poorly on spots having weak signals and on microarray images that are noisy. In these situations, the intensity distributions for signal and background are overlapping. This overlapping of intensity distributions inherently limits the performance of threshold-based segmentation.

The method of trimmed measurements is another method that uses both spatial and intensity information to perform segmentation. In this method, a circle is placed around the signal region after the signal detection process. In most cases, some signal pixels will be outside the circle and some background pixels will be inside the circle. The impact on threshold calculations are removed by "trimming off" these pixels from the intensity distributions for signal and background. A significant problem with this method, however, is the reliance on the precision of the location of the center of the circle and the determination of its radius. Small errors in either may result in the loss of significant signal information regarding the spot. Furthermore, the method incorrectly presumes that the spot is always circular. When the spot not circular, the method again fails to identify significant signal information.

A need exists, therefore, for a robust system and method for segmenting and characterizing gene expression spots. Specifically, a need exists for a system and method that discerns contamination regions, noisy images, low signal spots, and also preserves a maximum of signal information.

SUMMARY OF THE INVENTION

The present invention is directed to an improved system and method for automatically segmenting detected signals associated with chemical materials, such as gene expression signals, in an array while automatically accounting for any inherent inconsistencies and errors in the array generation process. A preferred configuration includes a scanner having a digital scanning sensor and an output, the digital scanning sensor scanning the array and transmitting from the output a digital image of the array, a memory for storing the transmitted digital image, and a processor. The processor processes the digital image stored in the memory, detecting a signal of a chemical material, segmenting the signal, and calculating a measure of the segmented signal.

Prior to segmenting the signal for a chemical material, the signal is characterized by a center-representing pixel in the digital image and an approximate radius around the center-representing pixel. The processor segments the signal by tentatively classifying pixels within the approximate radius of the center-representing pixel as signal pixels and those outside the approximate radius as background pixels. Then, the processor determines major intensity modes for the signal pixels and for the background pixels. Using the major intensity modes, the processor reclassifies the signal and background pixels depending on each pixel's intensity relative to the major intensity modes.

The above and other objects, features and advantages will become apparent to those skilled in the art from the following description of the preferred embodiments.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 depicts the preferred steps in the overall microarray process and the data produced after each step.

FIG. 3 depicts a process of array fabrication referenced in FIG. 2 including the data that that the process produces in the overall microarray process.

DETAILED DESCRIPTION OF THE PREFERRED EMBODIMENTS

Figure 1:
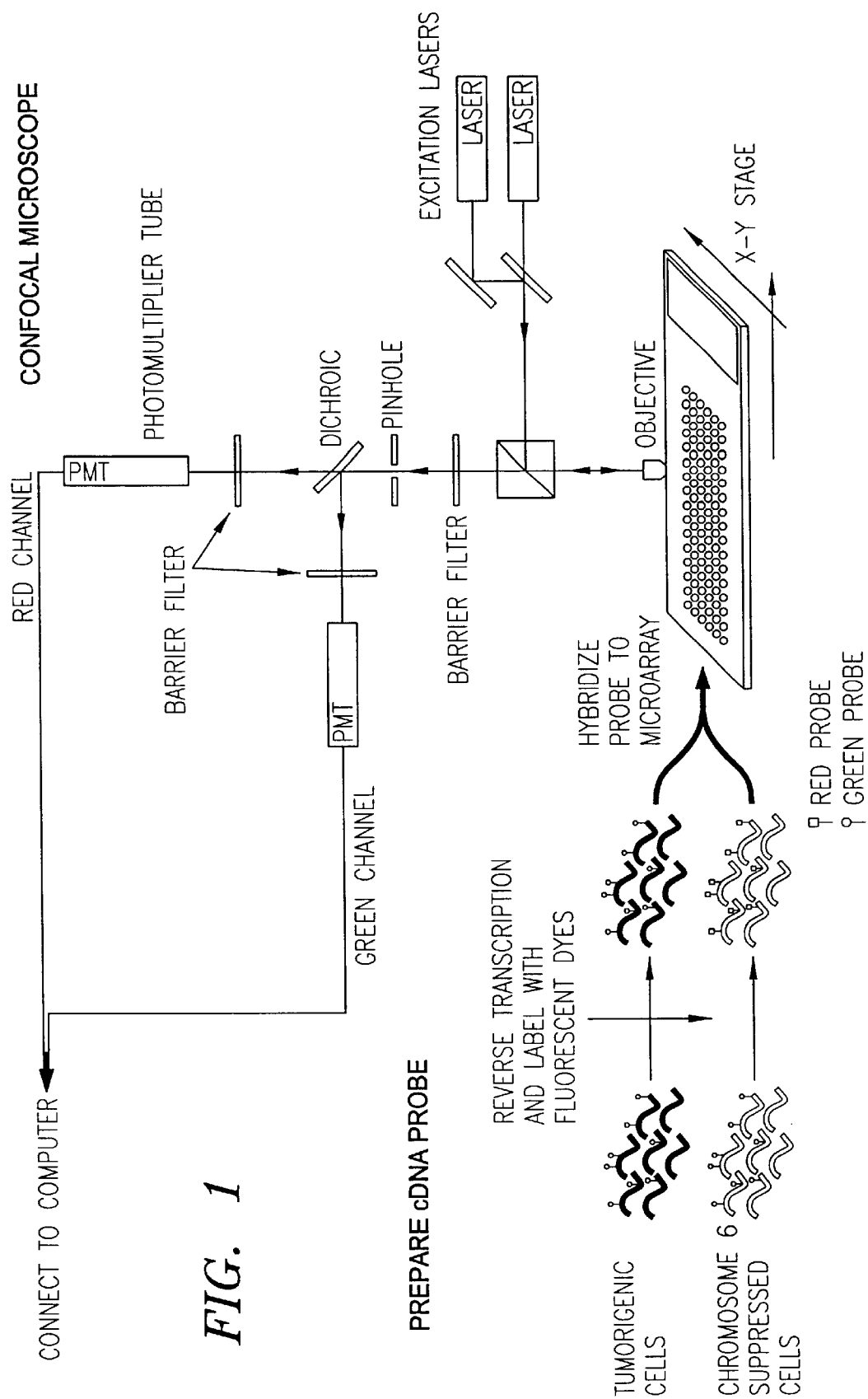
FIG. 1 depicts a microarray system as is known in the art and depicted in the Journal of Biomedical Optics article dated October 1997 by Yindong Chen et al. entitled Ratio Based Decsions and the Quantitative Analysis of cDNA Microarray Images.

The term "species" as used herein with respect to nucleic acids refers to a group of nucleic acid molecules, all of which comprise the same nucleotide sequence, allowing all to hybridize under stringent conditions to the same probe.

FIG. 2 depicts basic steps in the overall microarray process 100 according to a preferred embodiment, and the form of the data produced and carried forward during this process. The data is stored in a computerized database system that has memory sufficient to hold the data collected from each step in the microarray process 100, and has the capability of relating the data collected in each step with the other data collected throughout the process 100.

In the first step 200 of the microarray process 100, the gene expression experiment is designed. In this step 200, the genes to be tested are identified and recorded as data 202 for reference in any of the subsequent steps in the microarray process 100. Also, in this step 200, the basic design aspects of the microarray process steps that follow this step 200 are designed.

In the second step 204, the microarray is fabricated. During this step, array fabrication data 206 is collected. FIG. 3 depicts the preferred sub-steps performed in the array fabrication step 204. These sub-steps include a microarray design sub-step 300, a microarray setup sub-step 302 and a hybridization sub-step 304. In the array design sub-step 300, plate and array data 306, 308 are gathered and used and the settings 310 for an arrayer that deposits the spots on the microarray slide are established. In sub-step 300, the layout of the gene deposits on the slides is determined. Certain parameters that describe the layout are also determined and recorded. These parameters include the number of trays, the number of slides per tray, the number of spots on each slide, the size of each spot expression region, the spot spacing and the pattern on the slides. In the arrayer setup sub-step 302, the settings 310 for the arrayer are input and the microarray slides with spot samples are generated. In step 302, the total number of plates, slides, etc. is determined and the microarray slides with samples are produced. Furthermore, data on the laboratory conditions including the temperature, humidity, the airflow rate, the arrayer's speed and acceleration, the operator and any other relevant parameters are recorded and saved. Then, the hybridization sub-step 304 is performed and data 305 on the performance parameters for this step 304, including the hybridization method, protocols and chemical buffers used and other experimental conditions are recorded and saved for use in one or more of the subsequent steps of the microarray process 100.

Referring again to FIG. 2, after the array fabrication step 204, an array-scanning step 208 is performed in which the array is scanned and a gray-scale digital image of the microarray slide is produced. In this step 208, scanning parameters are also determined and saved as scanning data 210 that may be used in subsequent steps of the microarray process 100. Data for this step 208 includes, among other things, the gain, speed, pixel size, pattern and position size for the scanning device. Once the microarray is scanned, in an image analysis step 212, the resulting digital image is analyzed to extract the intensities at each sample location. Image analysis data 214 is produced by this process step 212 and is used to perform, in a final step 216, a gene expression analysis.

Figure 4:
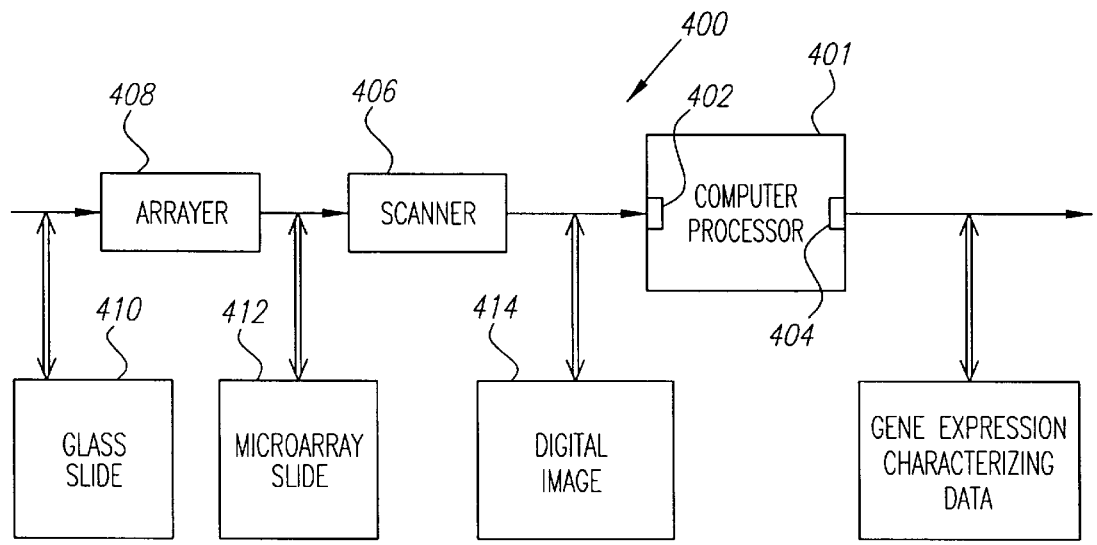
FIG. 4 depicts a preferred embodiment of the system of the present invention for processing a microarray slide through the array fabrication, array scanning and image analysis steps referenced in FIG. 2 and obtaining gene expression analysis data.

FIG. 4 illustrates a preferred system 400 for performing the microarray process steps depicted in FIGS. 2 and 3. As depicted in FIG. 4, the system 400 includes a high-speed image processing computer 401 having a processor, a memory, a data input port 402 and a output port 404. The system further includes a scanner 406, and an arrayer 408. The arrayer 408 places the spot samples on a glass slide 410 to generate a spot-filled microarray slide 412. The arrayer 408 is typically comprised of an XYZ cantilever robot holding 16 quill-pen type probes. The arrayer 408 also preferably includes a vacuum chuck for holding 48 standard microscope slides 410, a microtiter tray loader/stacker, a wash/dry station, a controlling computer, air handling components, and a cabinet. The robot moves only the probe holder with the probes spaced on 9 mm centerlines to conform to the well spacing of standard microtiter trays. The microtiter tray/stacker/loader holds a plurality of microtiter trays and presents them one at a time to the robot load station when commanded by the controlling computer. The wash/dry load station flushes the probe tips with clean water and then dries them with a blast of clean air from the cabinet, the blast being pulled past the tips with the vacuum. The arrayer's controlling computer controls all of the other component functions.

Once the arrayer 408 places the spots to generate the microarray slide 412, the scanner 406 scans the microarray slide 412 and produces a digital image of the microarray slide 408 at its output 408. The output of the scanner 406 is a digital image in a gray scale pixel format of the microarray 408. The scanner 406 preferably includes a digital scanning sensor and an output port. The scanning sensor preferably further includes its own computing processor such as an Intel™ Pentium™ or another high-speed processor for controlling an inverted scanning fluorescent confocal microscope with a triple laser illumination system. The scanning sensor preferably performs at least 100 mm/sec scans with five-micron resolution. Scanning is done in a comb pattern with data collected in both directions. The digital data is acquired using an integrator and preferably a standard 16-bit A/D converter in the scanning sensor's processor.

Once the digital image of the microarray is output by the scanner 406, the image processing computer 401 processes the digital image 414. The image processing computer 401 is preferably electrically connected at its input port 402 to the output port of the scanner 406. The digital image 414 of the microarray slide 412 is then processed by the image processing computer 401. At the output 404 of the computer 401, the image analysis data 416 that is used to perform the gene expression analysis in the next microarray process step 216 is provided. This data generally includes measurements of the attributes that characterize the gene expression signal of each spot in the microarray.

Preferably, the digital image 414 is processed in software operating on the computer 401. A computer 401 executing software is preferably used because of the utility and flexibility in programming and modifying the software, viewing results, and running other peripheral applications. While the embodiment shown in FIG. 4 illustrates a preferred system in which a computer 401 is utilized, alternatively, computer 401 may be implemented as any type of processor or processors that is capable of processing the digital image as described herein. Thus, as used herein, the term "processor" refers to a wide variety of computational devices or means including, for example, using multiple processors that perform different processing tasks or have the same tasks distributed between processors. The processors themselves may be general purpose CPUs or special purpose processors such as are often conventionally used in digital signal processing systems. Further, the multiple processors may be implemented in a server-client or other network configuration, as a pipeline array of processors, etc. Moreover, the processing need not be performed at a single location. One or more steps in the processing can be performed remotely such that data needed to perform one or more subsequent steps in the process is communicated electronically. Further, some or all of the processing steps can be implemented with hard-wired circuitry such as an ASIC, FPGA or other logic device. In conjunction with a processor, the term "memory" refers to any storage medium that is accessible to a processor that meets the memory storage needs for processing the digital image.

Figure 5:
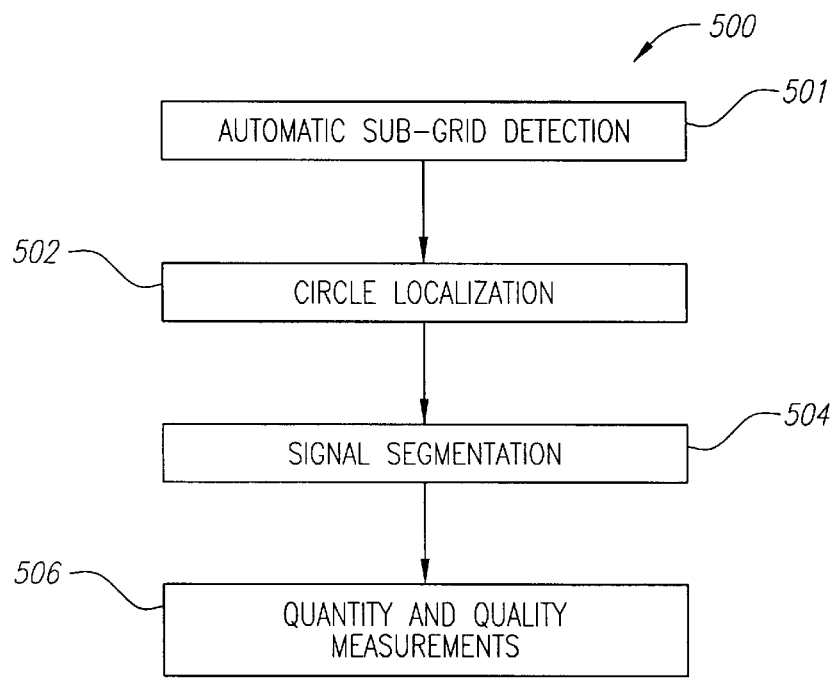
FIG. 5 depicts a preferred embodiment of preferred basic steps in processing a microarray image in the image analysis step of FIG. 2.

The basic steps for processing the microarray as a digital image in the processor 401 is shown in microarray processing sequence 500 of FIG. 5. While these basic steps and their sub-steps, as they are recited herein, are described in the context of microarray gene expression analysis, they may be applied to the analysis of other chemical (including biological) materials such as protein gels or tissues that are manifested as irregular spots or signals in an array of such spots or signals.

Figure 6:
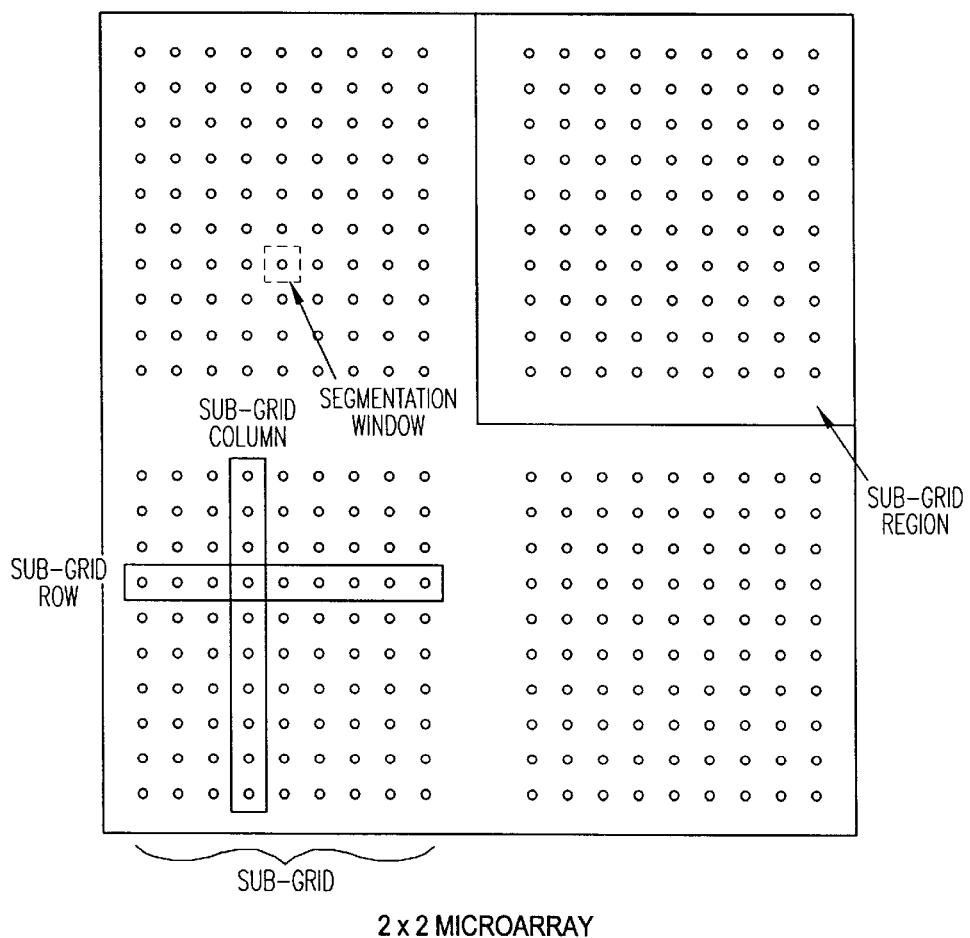
FIG. 6 depicts a hypothetical microarray in the form of a 2×2 set of sub-grids.

The first step is the automatic detection of sub-grids 501 in the microarray image. A hypothetical example of a microarray image is shown in FIG. 6 to conceptualize the automatic sub-grid detection step 501. FIG. 6 depicts a 2×2 "meta-grid" of four sub-grids. In the figure, each sub-grid has nine columns and ten rows. Moreover, the meta-grid has two meta-columns and two meta-rows. In detecting the sub-grids, the rows and columns of each sub-grid of spots in the image are identified. The second basic step is circle localization 502, wherein the center of each spot is identified. The third step is signal segmentation 504, wherein the pixels in the microarray image that represent gene expression signal are identified. The fourth step is the calculation of quantity and quality measurements 506, wherein features of the identified signal pixels and the background pixels are calculated and used to form the basis for, among other things, a confidence measure regarding the signal measurements. Although each of the basic steps 501, 502, 504, 506 is rigorously performed as later described, none of the basic steps assumes or relies on the perfect performance of any of the other basic steps. As such, the overall performance that is achieved in the microarray processing sequence 500 is superior to prior methods.

Figure 7:
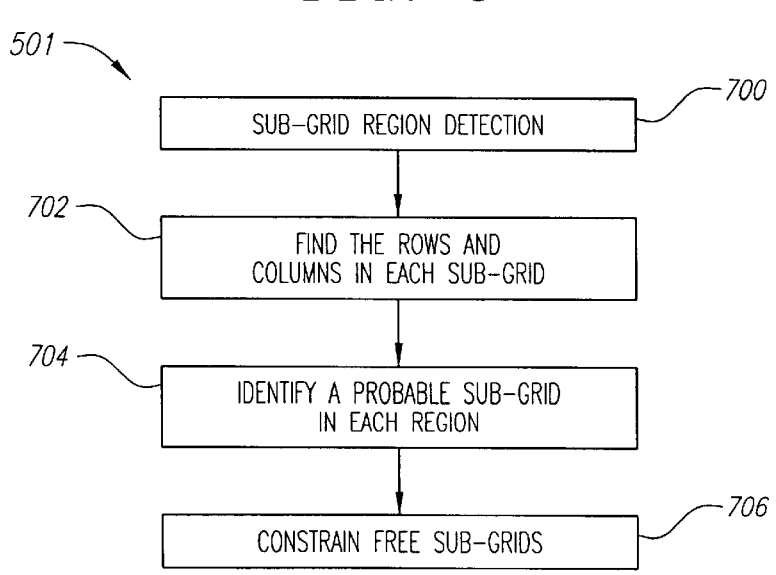
FIG. 7 depicts a preferred embodiment of the basic steps in the automatic sub-grid detection process referenced in FIG. 5.

FIG. 7 depicts the steps performed in the automatic sub-grid detection process 501. As discussed above, a microarray typically consists of a two-dimensional array of gene expression sub-grids. The first step 700 in the automatic sub-grid detection process 501 is to determine the general locations of the sub-grids in a microarray. Specifically, preferably rectangular regions of a microarray are identified in which each identified region contains only one sub-grid. Because the set of sub-grids in a microarray are normally configured as a two-dimensional array, the identification of each sub-grid region can be performed by identifying horizontal and vertical lines in the microarray that effectively isolate each sub-grid region. Preferably, the method of identifying a horizontal or a vertical line that partitions a sub-grid region is the same whether the identified line is horizontal or vertical.

Figure 8:
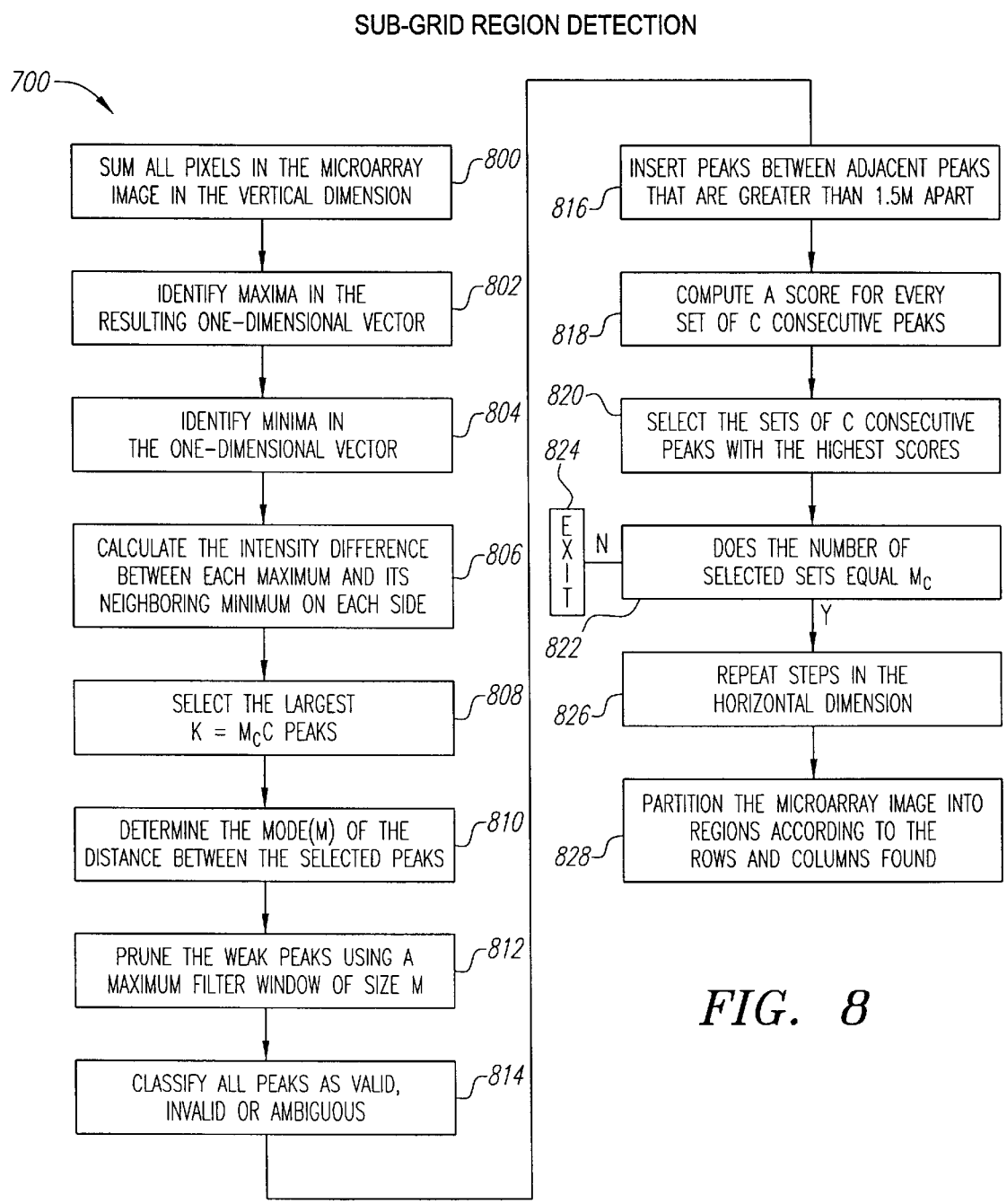
FIG. 8 depicts a preferred embodiment of the steps in identifying sub-grid regions in a microarray referenced in FIG. 7.

As shown in FIG. 8, the method of identifying a horizontal or vertical line to isolate a sub-grid region is preferably comprised of the fourteen steps discussed below. The method is essentially the same regardless of whether a horizontal or vertical line is identified. Outlining the steps for initially identifying a vertical line, the first step 800 is to sum all pixels in the microarray image in the vertical dimension to form an ordered one-dimensional horizontal vector. In the second step 802, the maxima in the resulting one-dimensional vector are identified. To do this, a "maximum" filter is preferably used that returns a "1" if an element of the vector is the largest element in a window centered on the element. The window size is preferably set equal to the expected diameter in pixels of the spots in the microarray image. The diameter is preferably provided from the array scanning step 208 in the microarray process 100 and is normally between about 20 and about 30 pixels. Similarly, in the next step 804, the minima in the one-dimensional horizontal vector are identified. To identify the minima, a "minimum" filter is preferably used having a size that is the same as the maximum filter used in the previous step 802. The minimum filter returns a "1" when the filter is centered on an element that is the smallest element in the filter window.

Once the locations of the maxima and minima are determined, in the next step 806, the intensity differences between each maximum and each maximum's nearest minima on each side in the ordered horizontal vector are calculated. By calculating the intensity difference, the relative height in intensity of each maximum is established. These relative heights are the "peaks" in the horizontal vector. Next, a predetermined number, K, of the largest peaks are selected for consideration 808. For the horizontal vector, K is preferably set to the number of meta-grid columns multiplied by the number of columns in a sub-grid. Thus, K expectedly is equal to the total number of columns in the microarray. In FIG. 6, for example, K equals 18. Next, the mode of the distance between the selected K peaks is determined 810. To determine the mode of the distance, the distance in pixels between adjacent peaks is found and then the mode for these distances is calculated. The mode distance value is used in the next step 812 to remove the weakest of the K peaks that were previously selected for consideration. This mode distance is used as the size of a maximum filter for pruning away the weakest of the selected peaks. For example, when the filter is centered on one peak, and another smaller peak is within the window of the filter, that smaller peak is removed from consideration.

In the next step 814, a process is initiated in which the remaining peaks are classified based on their heights as one of three kinds: valid, invalid or ambiguous. Preferably, the classification step 814 begins by first, determining a first threshold intensity level for a valid peak. In a preferred embodiment, the first threshold level for a valid peak is equal to the median of the selected peaks multiplied by about 0.3. In the second part of the step 814, the peaks that exceed the first threshold level are classified as valid peaks. Third, a second intensity threshold is determined to classify invalid peaks. The intensity threshold for invalid peaks is preferably set at the height of the lowest of the previously selected K peaks multiplied by 0.75. In the fourth part of the classification step 814, all of the peaks falling short of this second threshold are classified as invalid peaks. Finally, the peaks below the first threshold but exceeding the second threshold are classified as ambiguous peaks.

After completing this basic peak classification step 814, the automatic sub-grid detection process 501 continues to the next step 816, wherein peaks are inserted into the ordered horizontal vector. To perform the insertion, when the distance between two adjacent peaks is more than about 1.5 times the mode distance, then a peak is preferably inserted at the midpoint between them. The inserted peak is then classified as an invalid peak. This process step 816 is preferably performed for all of the originally selected K peaks. In the next step 818, a score is computed for every set of C consecutive peaks, where C is equal to the expected number of columns in a sub-grid. The score for each set of C consecutive peaks is calculated by subtracting the number of invalid peaks from the number of valid peaks in each set. Where the total number of peaks in the vector is N, there should be N−C+1 overlapping sets of C consecutive peaks.

Once the scoring step 818 is performed, a process 820 for selecting for and eliminating from consideration sets of C consecutive peaks is initiated. First, the set of C consecutive peaks with the highest computed score is selected. Once that set is selected, the sets of C consecutive peaks that overlap with this selected set are removed from consideration. This selection/elimination process 820 continues by selecting from the remaining sets the set of C consecutive peaks with the highest score, and then removing from consideration the sets that overlap the selected set. This selection/elimination process 820 is performed until all of the sets are either removed or selected. In the end, it is expected that the number of selected sets equals the number of meta-columns in the microarray. In the next step 822, the number of selected sets is compared to the number of meta-columns. If the number of selected sets does not equal the number of meta-columns, the automatic sub-grid detection process is considered unsuccessful. If automatic sub-grid detection process is considered unsuccessful, then the process to step 824 and exits. If the number of selected sets equals the number of meta-columns, the automatic sub-grid detection process is considered successful to that point and continues forward to step 826. In this successful case, the selected sets of C consecutive peaks specify all of the columns of spots in the microarray where each set corresponds to the sets of columns for each sub-grid.

According to the next step 826, the previous steps in the sub-grid region detection process 700 are repeated. This time, however, the previous steps in the sub-grid region detection process 700 are performed to identify the meta-rows in the microarray image. Finally, after all of the sets of rows and columns are determined, the microarray image is partitioned 828 into spatial regions according to the meta-row and meta-column locations found in the above process steps.

Figure 9:
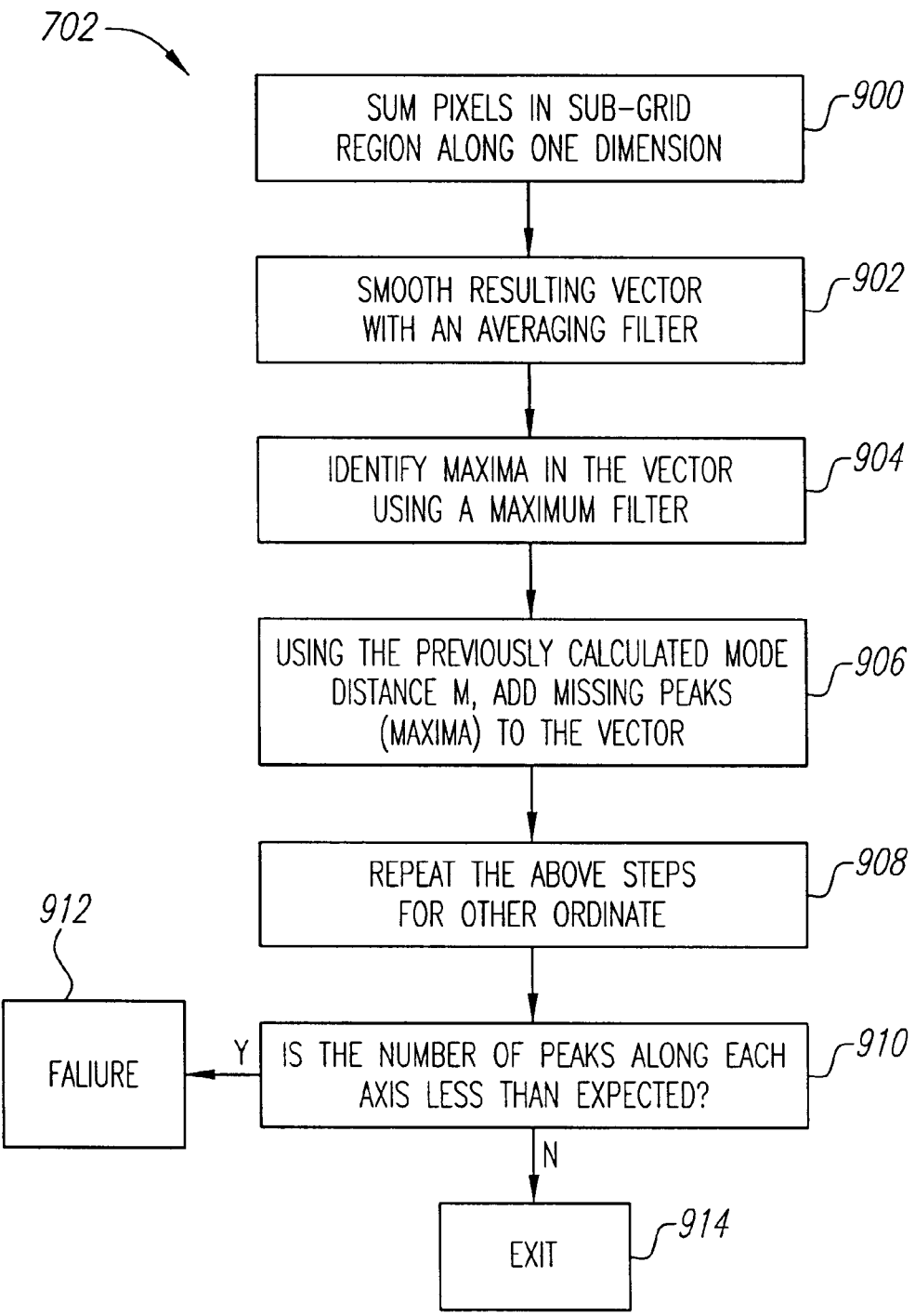
FIG. 9 depicts a preferred embodiment of the steps in detecting, as referenced in FIG. 7, the rows and columns in each sub-grid of a microarray.

After the spatial region for each sub-grid has been partitioned, the automatic sub-grid detection process 501 proceeds to identify, as shown in FIG. 7, the rows and columns for each sub-grid of step 702. Again, the steps to find the rows in a sub-grid are preferably essentially the same as the steps for finding the columns. Thus, only the process for identifying columns in a sub-grid is outlined below. FIG. 9 depicts steps for a preferred row/column detection process 702. In the first step 900, all of the pixels in a sub-grid region along the vertical dimension are summed to form a one-dimensional horizontal vector. Next, an "averaging" or low pass filter whose width is equal to the expected diameter of the spots is applied to the vector in step 902. This averaging step 902 is performed because the image of each sub-grid region is smaller than the overall microarray image that was processed in the previous sub-grid region-locating step 700. By applying the averaging filter, the noise that is inherent in a typical microarray image is reduced. Next, the maxima or peaks in the horizontal vector are determined in step 904, again using a maximum filter in which the size of the maximum filter is preferably equal to the expected spot size. In the next step 906, using the previously calculated mode distance M to establish additional peak locations, peaks are added to the vector to fill the length of the sub-grid region. The resulting peak locations specify the locations of the columns in the sub-grid region. The previous steps for detecting the columns in a sub-grid region are repeated 908 to determine the locations of the rows in the sub-grid or vice versa. Finally, a check step 910 is performed to determine whether the number of peaks for each vector is at least as high as expected. For the horizontal vectors, the number of peaks should equal or be greater than the expected number of columns in a sub-grid. For vertical vectors, the number of peaks should be equal to or greater than the number of rows in a sub-grid. If the number of peaks is less than expected for a horizontal or vertical vector, then the process exits at step 912, having not performed successfully. If the number of peaks for a given vector is equal to or greater than the expected number, then the process exits at step 914 with the row and column detection process 702 being considered successful. With a successful completion of this process, the rows and columns define candidate sub-grids with grid-point intersections in each sub-grid region of the microarray.

Referring to FIG. 7, the next step 704 in the automatic sub-grid detection process 501 is the identification of a probable sub-grid in each region from the rows and columns identified in the previous step 702. As discussed above, the identified number of rows and columns in each region should exceed the expected number of rows and columns of a subgrid. Thus, the specific rows and columns that correspond to the sub-grid in each region are next determined.

Figure 10:
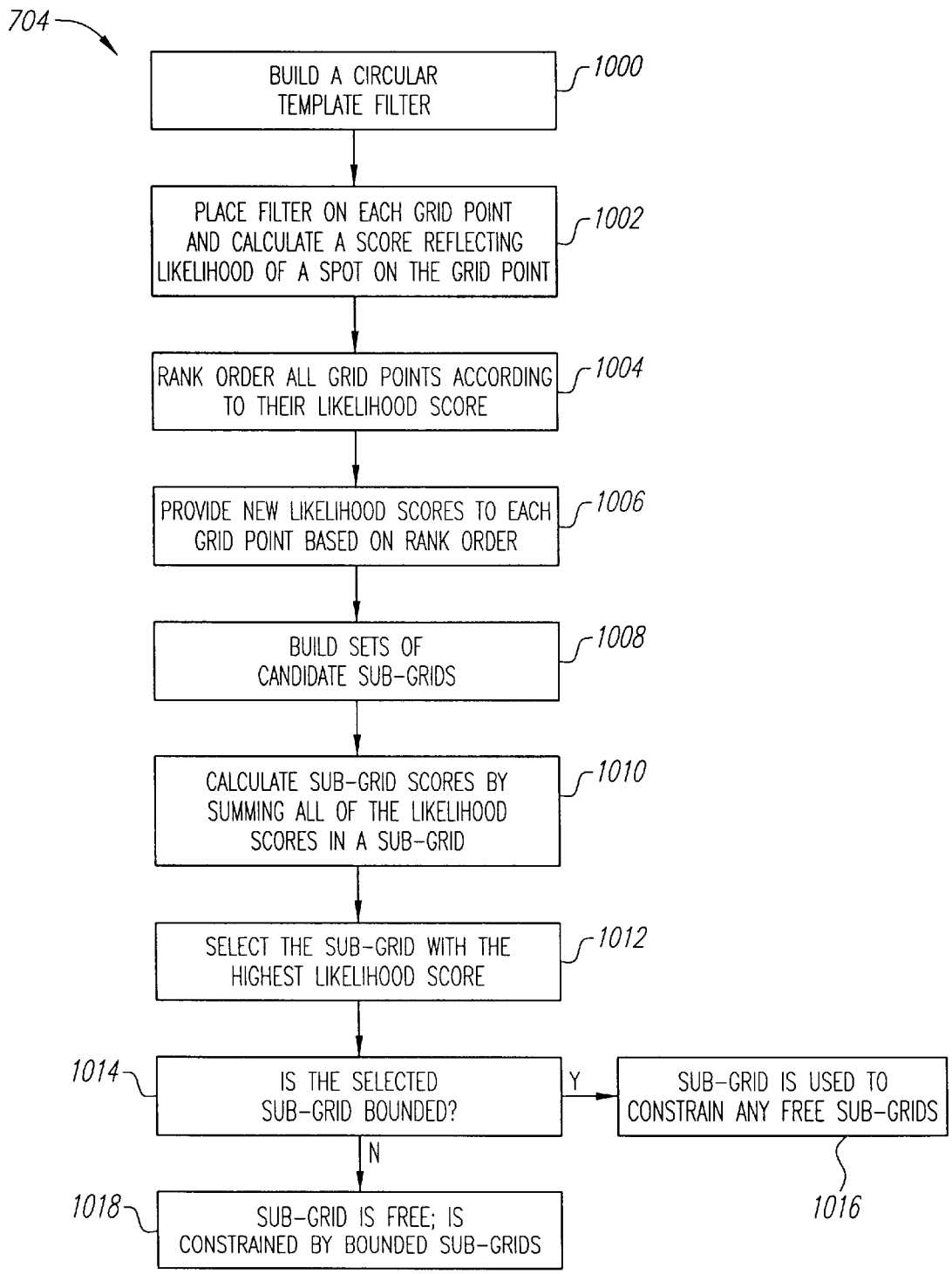
FIG. 10 depicts a preferred embodiment of the steps, as referenced in FIG. 7, in identifying a probable sub-grid in a sub-grid region of a microarray image.

FIG. 10 outlines the sub-steps of step 704 in determining the probable sub-grid in each partitioned sub-grid region. First, a circular template is built in step 1000, the circular template preferably having a circular center area of pixels with a ring of pixels around the center area of pixels. The diameter of the template is preferably equal to the shortest distance between grid points in a given sub-grid region. The size of the circular center area is preferably equal to the expected spot size. The pixel values in the circular center of the template are preferably set to "1." The pixel values in the ring around the circular center are preferably set such that the sum of all of the pixel values in the template is zero. Thus, the pixel values in the ring region are all preferably set to some negative value, the magnitude of which depends on the ring size. In the next step 1002, the filter is centered on each previously established grid point and a score is calculated. The score reflects the likelihood of a gene-expressing spot on that grid point. The score is computed by summing all of the pixels in the template window around the grid point after they are multiplied by the pixel weights in the circular template. In the next step 1004, all of the grid points are rank-ordered according to their likelihood scores that were calculated in the previous step 1002.

Next, new likelihood scores are provided for each grid point based on their rank order in step 1006. The new rank order-based scores for each grid point preferably being determined by: (1) assuming that the sub-grid is expected to have R rows and C columns, for grid points having the top 0.5×R×C likelihood scores, the new likelihood score is preferably set to 1.8; (2) for the remaining grid points that were in the top 0.8×R×C likelihood scores, the new likelihood scores are preferably set to 1.0; (3) for the remaining grid points with likelihood scores among the top RC likelihood scores, the new likelihood scores are preferably set to 0.5; (4) all remaining grid points, their likelihood scores are preferably set to zero. In the next step 1008, based on these newly assigned likelihood scores, candidate sets of sub-grids of dimension R×C are determined. Sub-grid scores are determined for every possible sub-grid of size R×C in the sub region. The sub-grid score for a sub-grid is calculated in step 1010 by summing the likelihood scores of every grid point in the candidate sub-grid. Then, the sub-grid with the highest likelihood score in each region is selected in step 1012 as the most likely sub-grid for that sub region. Preferably, the next step 1014 is to determine whether the selected sub-grid is "bounded." A bounded sub-grid is one in which there are gene-expression spots in the leftmost column, the uppermost row, the rightmost column, and the lowermost row. If a sub-grid is unbounded on any one or all of its sides, then that sub-grid is considered "free." A determination of whether a sub-grid is bounded or free is made for the probable sub-grids in each region of the microarray.

After the bounded-or-free determination is made for the probable sub-grids, the bounded sub-grids are used to constrain or "bind" any free sub-grids in constraining step(s) 1016, 1018. Referring to FIG. 7, this step 706 is the last basic step in the automatic sub-grid detection process 501. Since the previous steps may not have confidently identified every probable sub-grid within the microarray, this constraining step 1016, 1018 is performed. The purpose of this step 1016, 1018 is to use the probable sub-grids that have been confidently identified to aid in fixing the locations of other probable sub-grids whose exact positions in their respective sub-grid regions remain uncertain (i.e. are free). For example, if a sub-grid is bounded on its left side and the sub-grid above it in the microarray meta-grid is unbounded on its left side, the position of the leftmost column in the lower sub-grid is used to constrain or "bind" the leftmost column of the upper sub-grid. The lowermost row, uppermost row or rightmost column of a bounded sub-grid is similarly used to constrain other free sub-grids. Moreover, these constraints are preferably propagated from sub-grid to sub-grid as free sub-grids become bounded. After the constraint process has been exhausted to bind the free subgrids, any remaining free sub-grids are constrained in a manner that minimizes the position offset between the free sub-grids and their neighboring bounded sub-grids.

Figure 11:
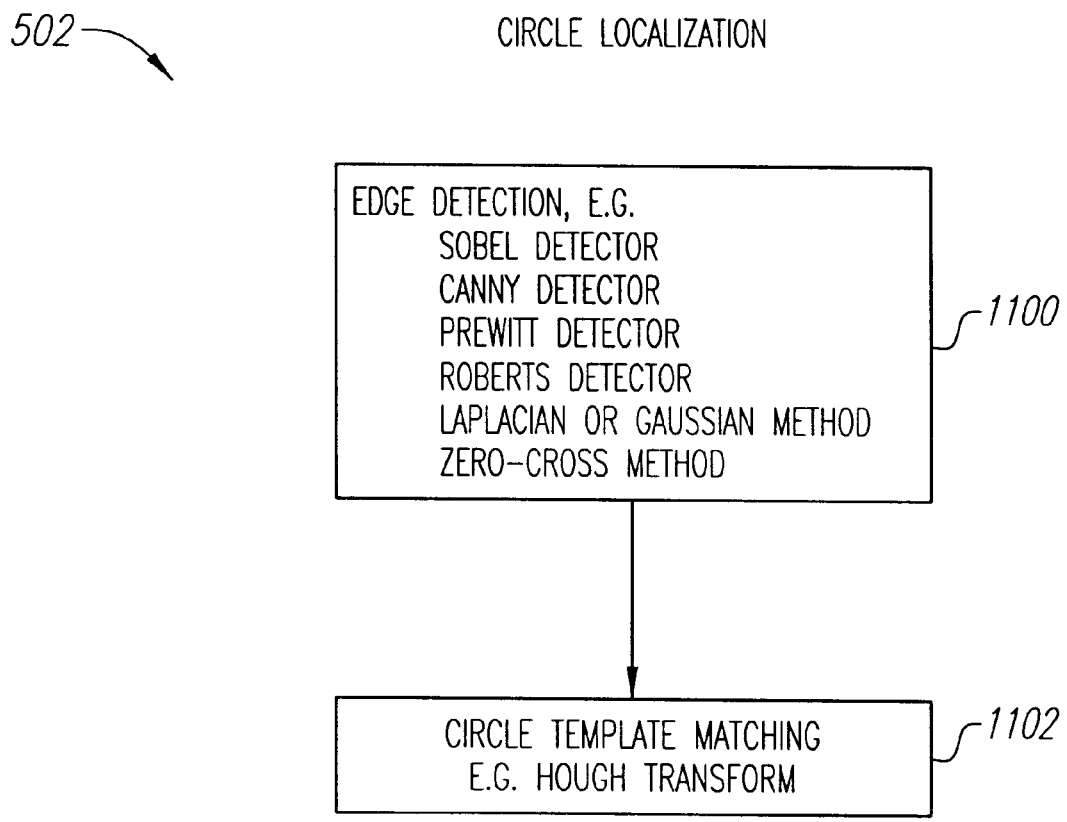
FIG. 11 depicts a preferred embodiment of the basic steps in performing circle localization, as referenced in FIG. 5, around a grid point in a microarray.

Referring again to FIG. 5, after the automatic sub-grid detection process 501 has been completed, the next step 502 is circle localization. FIG. 11 depicts the two basic steps in circle localization 502. In a first step, an edge detection process 1100 is performed on the microarray image to generate an edgemap for the image. In the edge detection process 1100, a number of different filters that are known in the art of image processing are optionally used. Such filters include a Sobol detector, a Canny detector, a Prewitt detector, a Roberts detector, Laplacian and Gaussian methods and zero-cross methods. Once the edge detection step is performed on the microarray image, and an edgemap has been created, the next step 1102 is circle template matching, an example of which is a Hough transform.

Figure 12:
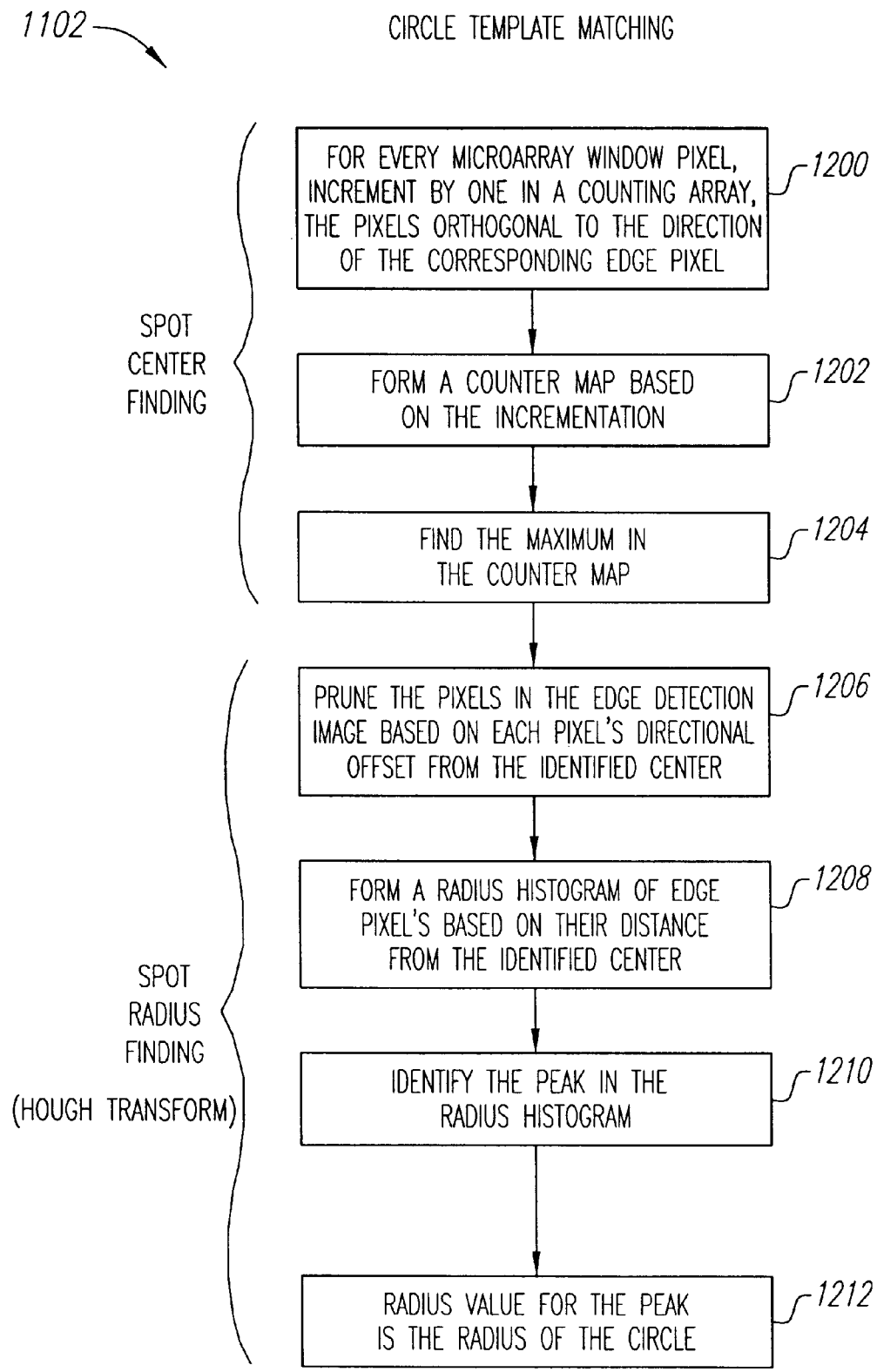
FIG. 12 depicts a preferred embodiment of the detailed steps in performing circle template matching, as referenced in FIG. 11.

FIG. 12 depicts a preferred embodiment of the specific steps in circle template matching process 1102. The first three steps 1200, 1202, 1204 in the circle template matching process 1102 operate to identify the center pixel for a given gene-expression spot. To perform the spot center finding process, initially, a window around each grid point is established. The size of the window is the distance in pixels between rows by the distance in pixels between columns that were previously determined for the identified sub-grid. In this window around each grid point, every edgemap pixel in the window is examined. For each pixel, the pixels orthogonal to the direction of the edge pixel and extending to the edge of the window are incremented by one in a counting array that maps to and has the same dimensions as the microarray window around the grid point. This incrementation of the counting array is the first step 1200 in the center pixel-finding process. By performing this operation on each pixel, a counter map is formed in step 1202 based on the incrementation of pixels in the window. After each pixel has been tested and the counter map has been generated, the maximum valued pixel in the counter map is identified in step 1204. This maximum-valued pixel is considered to correspond to the center of the gene expression spot for that particular gird point.

The next set of steps determines the radius of the spot around this determined center of the gene expression spot. In the first step 1206 of the radius finding process, the edge map pixels are pruned based on each pixel's directional offset from each pixel's direction to the identified center pixel. Preferably, if an edge pixel is outside of a +/−60-degree angle window in its direction from the direction to the center pixel, then that edge pixel is removed from consideration. For all others that remain after the pruning step is completed, a histogram is formed in step 1208 based on the distance between each edge pixel and the center pixel. Thus, the X-axis for this histogram is the distance of a given pixel from the previously identified center pixel. Once this radius histogram has been formed, the peak in the histogram is identified in step 1210. This peak expectedly corresponds to a large number of edge pixels that are about the same distance from the identified center pixel. The location a of this peak on the X-axis of the histogram is preferably established as the radius of the spot in step 1212. By establishing the center and now the radius of the spot for a given grid point, the circle localization step 502 in the microarray process is completed.

Figure 13:
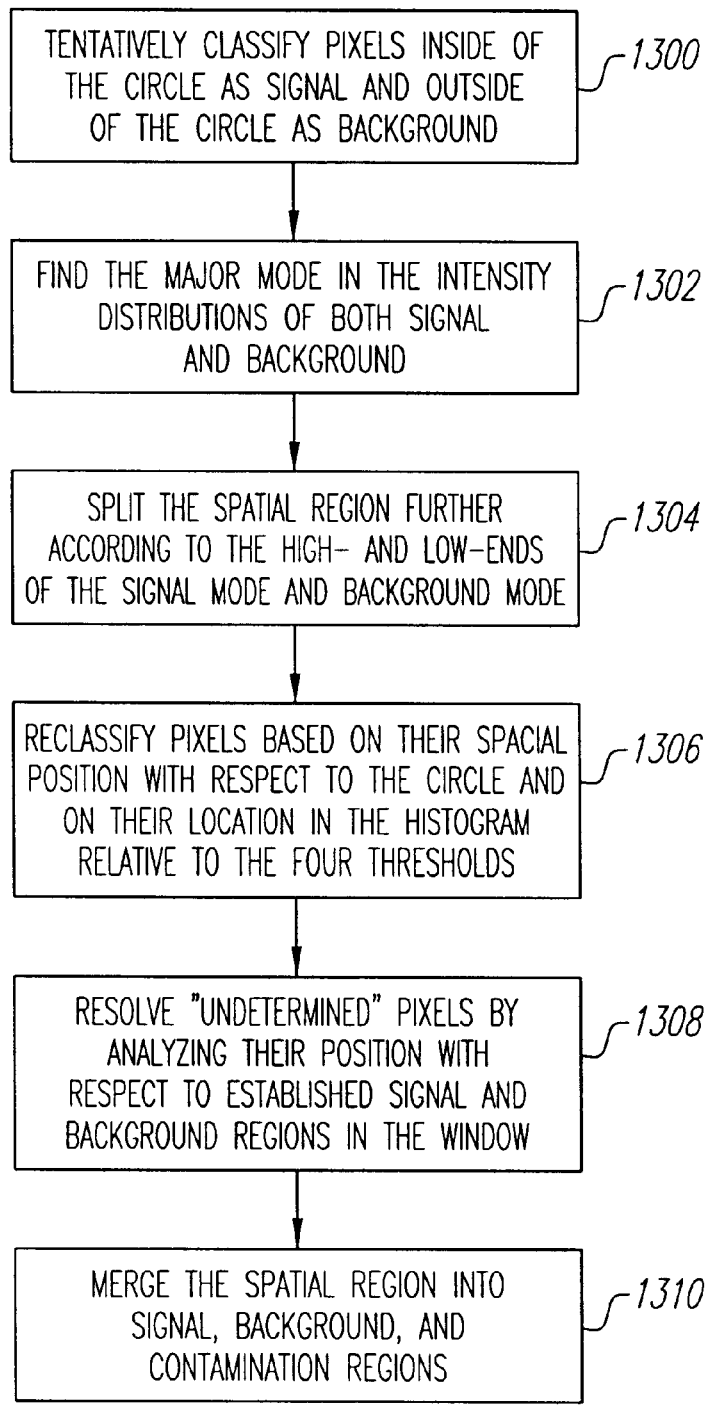
FIG. 13 depicts a preferred embodiment of the steps in performing signal segmentation, as referenced in FIG. 5, in a segmentation window in a sub-grid of a microarray image.
Figure 14:
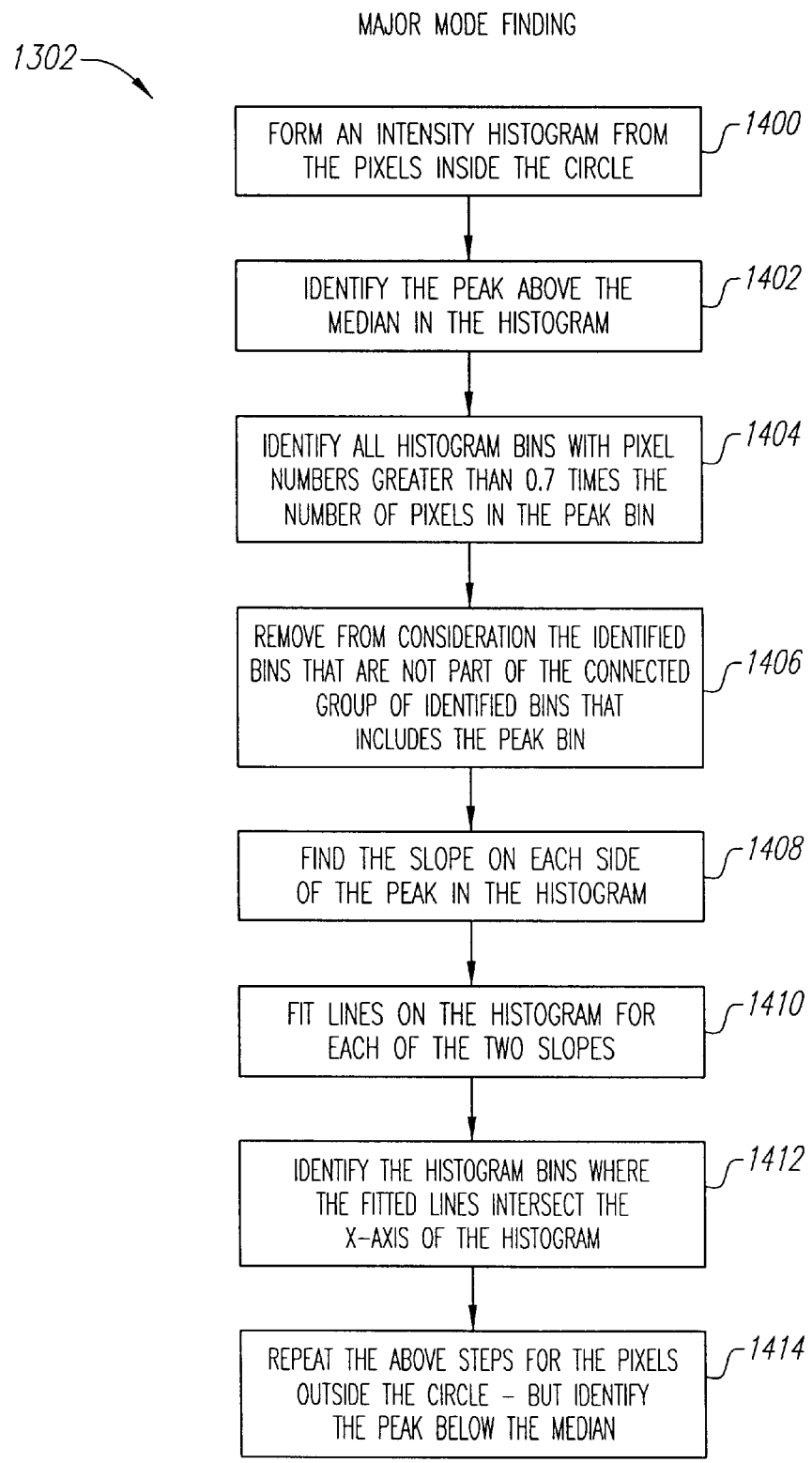
FIG. 14 depicts a preferred embodiment of the detailed steps in finding the major intensity modes, as referenced in FIG. 13, for the signal and background in a segmentation window.

Referring again to FIG. 5, the next step 504 is to segment or extract the gene expression signal from the region around each identified center pixel for each spot. FIG. 13 depicts the basic steps in segmenting the signal using the identified center and radius defining a circle for each gene expression spot. The first step 1300 in segmenting the signal for a given spot region is to tentatively classify pixels inside of the circle as signal and to classify those outside of the circle as background. The next three steps 1302, 1304, 1306 in the signal segmentation process refine this tentative classification. The second step 1302 is to find the major mode in the intensity distributions of both the tentatively classified signal pixels and the tentatively classified background pixels. In FIG. 14, the performance of this step 1302 is expanded into eight sub-steps. The actual sub-steps in FIG. 14 first outline the processing on the signal region. Later, essentially the same steps are repeated on the background region. In FIG. 14, the first sub-step 1400 is to form an intensity histogram from the pixels inside the circle. Next, the peak in the intensity histogram above the median intensity is identified in sub-step 1402. Having identified the peak, preferably all of the histogram bins with pixel numbers greater than the number of pixels in the peak bin multiplied by 0.7 are identified for consideration in sub-step 1404. In the next sub-step 1406, the identified histogram bins that are not part of a connected group of identified bins that includes the peak bin are removed. Thus, after this sub-step 1406, only a single group of connected bins should remain in consideration. This cluster of bins that includes the peak bin is preferably identified as the major mode of the histogram.

In the next sub-step 1408, the slope on each side of the peak in the histogram is found. Preferably, the following steps, which are essentially the same for the determination of both slopes, are performed to establish the slope on the high intensity side of the peak. First, the intensity histogram is differentiated and a differential histogram is created. The peak in the differential histogram is then identified, and then all of the differential histogram bins that are larger than 0.3 times the size of the differential peak are tentatively identified. The group of connected, tentatively identified bins that includes the differential peak is then identified. Then, in the next step 1410, from the group of identified bins, a slope line is fit on the original histogram. The same basic process of fitting a slope line is applied on the low intensity side of the peak in the original histogram to complete step 1410. The two slope lines are finally extended to cross the X-axis on the original histogram.

Figure 15A:
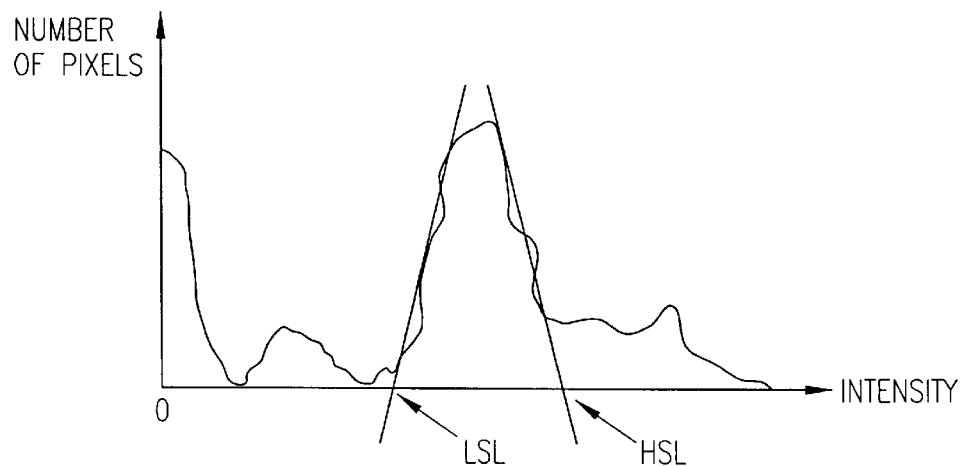
FIG. 15A depicts an example of a signal histogram with slope lines on both sides of the peak in the histogram as provided by one of the processing steps depicted in FIG. 14.
Figure 15B:
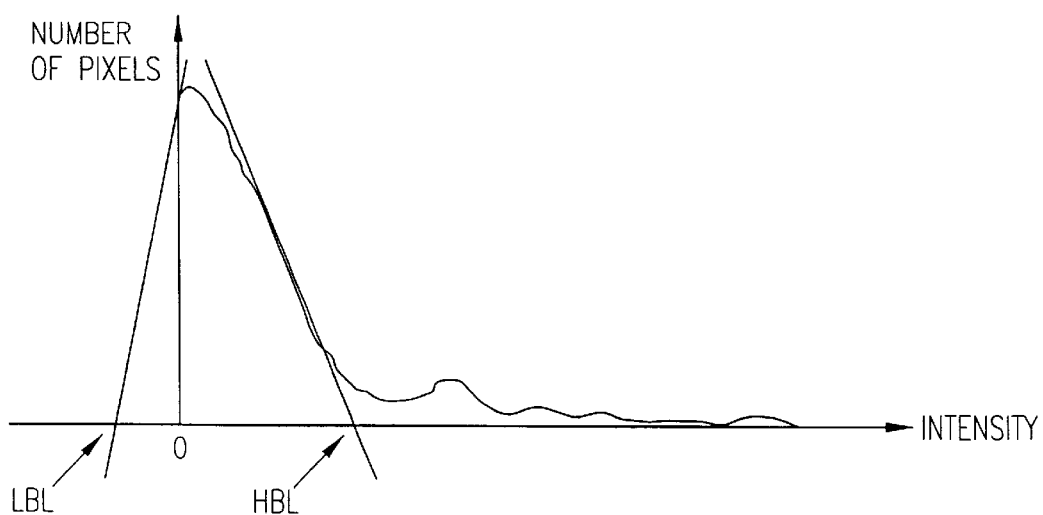
FIG. 15B depicts an example of a background histogram with slope lines on both sides of the peak in the histogram as provided by one of the processing steps depicted in FIG. 14.

In the next sub-step 1412, where the slope lines cross the X-axis of the histogram, the bins at these intersections are identified. An example of the result of the preceding operations on the histogram of tentative signal pixels is shown in FIG. 15A. In FIG. 15B, a similar histogram for the tentative background pixels is generated including the slope lines for that histogram. The slope lines for the tentative background pixel histogram are generated using the same sub-steps used to generate the slope lines in the tentative signal pixel histogram. Thus, the same basic sub-steps in the major mode identification process 1302 are repeated for the background histogram in sub-step 1414. The main difference in the process is that for the tentative background pixels, the histogram peak below the median intensity is initially identified rather than the peak above the median. In FIG. 15A, the bin at the intersection of the X-axis and the low intensity slope line of the peak in the signal histogram is identified as LSL for Low Signal Level. The bin at the intersection of the X-axis and the high intensity slope line of the peak in the signal histogram is identified as HSL for High Signal Level. Similarly, the corresponding intersections in the background histogram are LBL for Low Background Level and HBL for High Background Level. This partitioning of the histogram is the next step 1304 shown in FIG. 13.

Figure 16A:
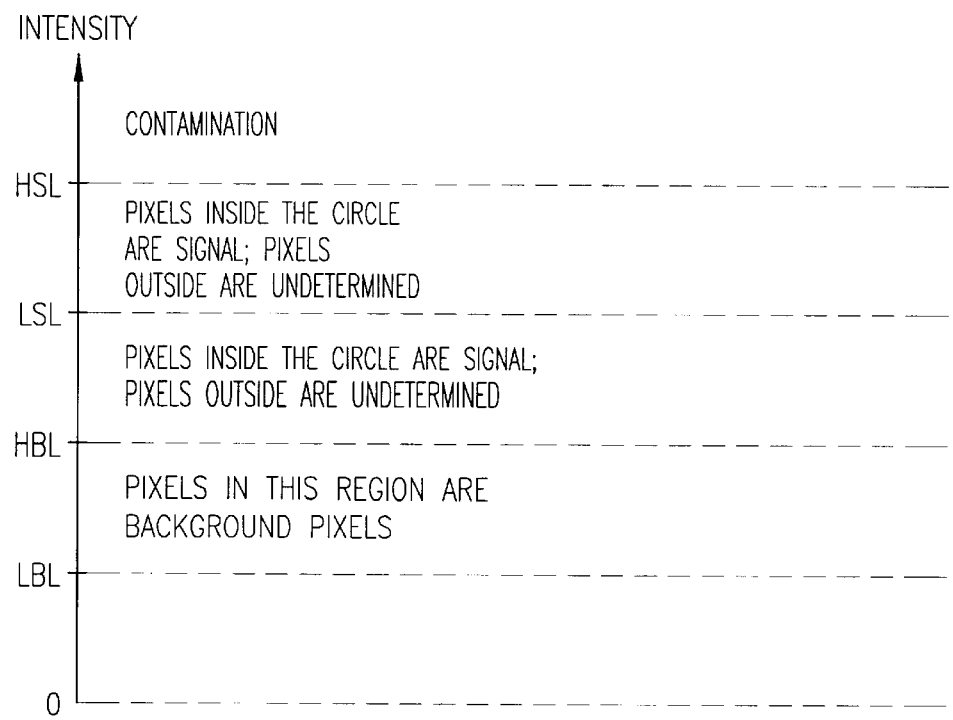
FIG. 16A depicts a preferred method of classifying pixels in a segmentation window, as is performed in the reclassifying step of FIG. 13, where the Low Signal Level (LSL) exceeds the High Background Level (HBL).
Figure 16B:
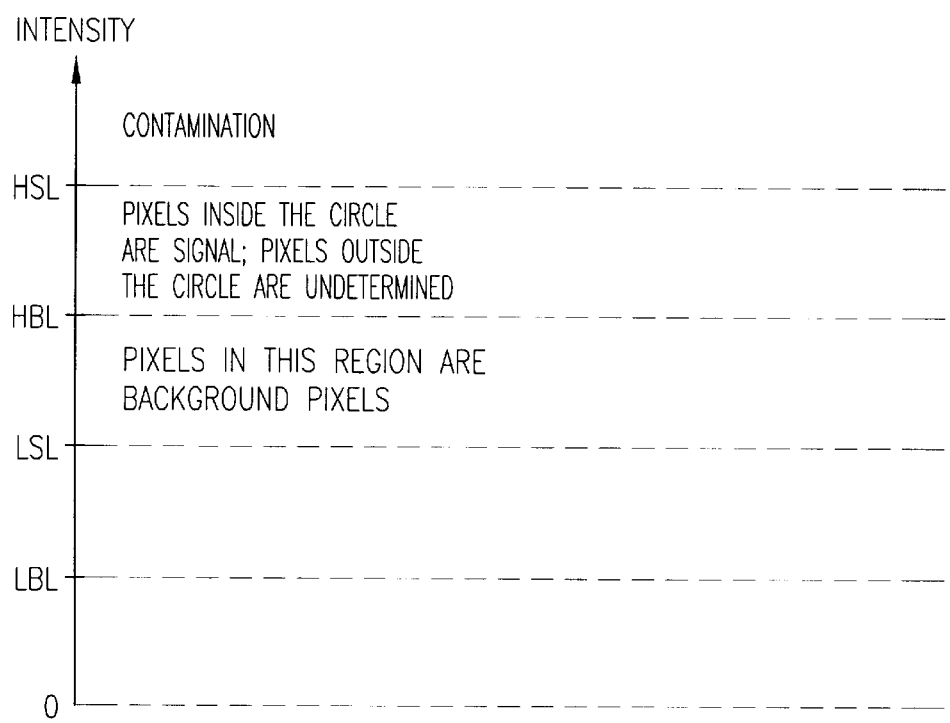
FIG. 16B depicts a preferred method of classifying pixels in a segmentation window, as is performed in the reclassifying step of FIG. 13, where the High Background Level (HBL) exceeds the Low Signal Level (LSL).

By so the thresholding the histogram, pixels in the window are reclassified in the next step 1306 according to their spatial position and their position in the histogram, i.e., whether they are in a group between LBL and HBL, between HBL and LSL, between LSL and HSL or above HSL. The classification of pixels according to their intensity and position with respect to the circle in the window is shown in FIGS. 16A and 16B. Specifically, in FIG. 16A, pixels with intensities above the HSL threshold are considered contamination pixels. Pixels with intensities above the LSL threshold but below the HSL threshold, and that are inside of the circle are considered signal. Pixels in the same histogram region but outside of the circle are considered "undetermined." Pixels with intensities above the HBL threshold but below the LSL threshold and that are inside the circle are considered signal pixels. Those outside of the circle with such intensity levels are considered "undetermined." Finally, pixels with intensities below the HBL threshold are considered background pixels, regardless of their position with respect to the circle in the window.

Similarly, referring to FIG. 16B, pixels with intensity levels above the HSL threshold are considered contamination pixels. Pixels with intensity levels above the HBL threshold and below the HSL threshold and that are inside the circle are considered signal pixels. Pixels with such intensity levels that are outside the circle are considered "undetermined." Finally, pixels with intensity levels below the HBL threshold level are considered background pixels. The distinction between pixels in the two figures is that, in FIG. 16A, the LSL threshold is greater than the HBL threshold, whereas in FIG. 16B, the HBL threshold is greater then the LSL threshold.

Finally, referring to FIG. 13, pixels that are undetermined are resolved in step 1308. For these pixels, their positions in the window with respect to just-established signal and background regions is used to classify them. Signal, background and undetermined pixels typically form somewhat homogeneous regions of each kind in the window. For example, a group of undetermined pixels may form an undetermined pixel region. Similarly signal pixels often form a homogenous signal region. The spatial relationship of homogeneous regions to an undetermined pixel or pixel region is used to classify the pixel or pixel region as background or signal.

In one preferred method of classifying an undetermined pixel region, if the region does not touch a signal region, the region is automatically classified as a contamination region. Alternatively, if the undetermined pixel region touches a signal region but does not touch a contamination region, the undetermined region is classified as a signal region. As another alternative, if the undetermined pixel region touches both a signal region and a contamination region, the undetermined region is classified as one or the other depending on a further analysis. Preferably, if the size of the contamination region that the undetermined region touches is smaller than ⅓ the size of the undetermined region, and the contamination region shares more than two-fifths of its border with a signal region, then the undetermined region is classified as a signal region. Otherwise, the undetermined region is classified as a contamination region. Optionally, this method of identifying spatial regions is repeated for any remaining undetermined regions. The newly identified spatial regions are used in the reperformance of this process. After all of the pixels have been classified, the spot in the segmentation window is identified by the pixels that have been classified as signal pixels in step 1310.

At this stage in the microarray image process, results of the process are determined as step 506. Referring to FIG. 5, this step 506 is the last step in the microarray processing sequence 500. In this step 506, signals are characterized and preferably, an evaluation of the signal characterization is performed. The signal characterization measurements quantify the expression levels of the genes in different ways. Signal characterization measurements include the mean of the intensity of the signal of a spot, the total number of pixels that comprise signal pixels (signal area), the median intensity and the mode intensity. The evaluation of the signal characterization measurements, on the other hand, determines various signal quality measurements that are based upon intermediate data and parameters that have been generated throughout the microarray process 100. Such signal quality measurements are preferably then incorporated into final confidence measures associated with each gene expression signal's measurements.

The quality measurements are generally one of two kinds, local and global. Local quality measurements are measurements in the window of a gene expression spot. These measurements include geometric properties of the signal and contamination regions in the window. One such measurement is the signal area referenced above. While being a signal characterization measure, signal area is also a signal quality measure. During array fabrication 204, one of the goals of automation of the microarray process 100 is the achievement of consistency in the preparation of each spot sample. While expression levels from sample to sample may vary, ideally, each sample results in a gene expression signal that circular, centered on a grid point, of a certain radius, and thereby a certain area. The particular radius preferably depends on the parameters established during the experiment design and/or the array fabrication steps 200, 204. The measurement of signal area, and in particular, its deviation from a signal's expected area as a result of the design of the overall microarray process 100, is therefore a factor that becomes relevant to any determination of confidence in the signal's measurement.

Figure 17A:
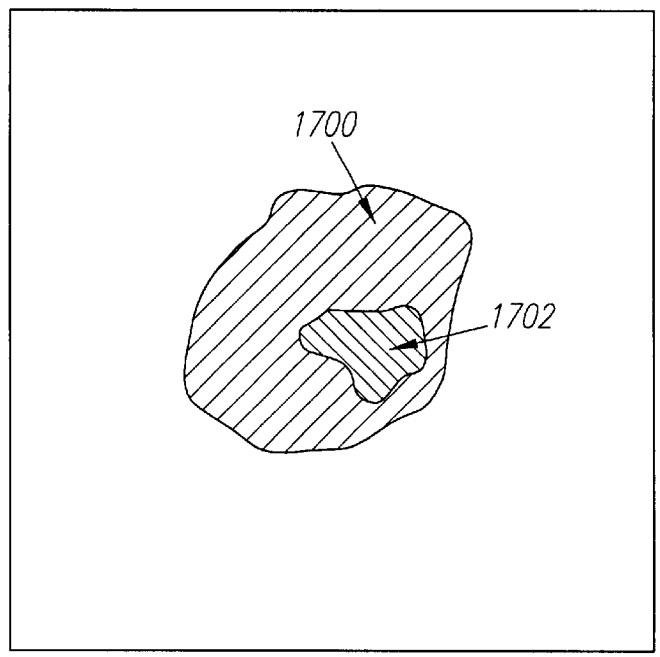
FIG. 17A depicts an example of a gene expression spot in a window of a microarray, in which the expression signal for the spot surrounds an intensity hole.
Figure 17B:
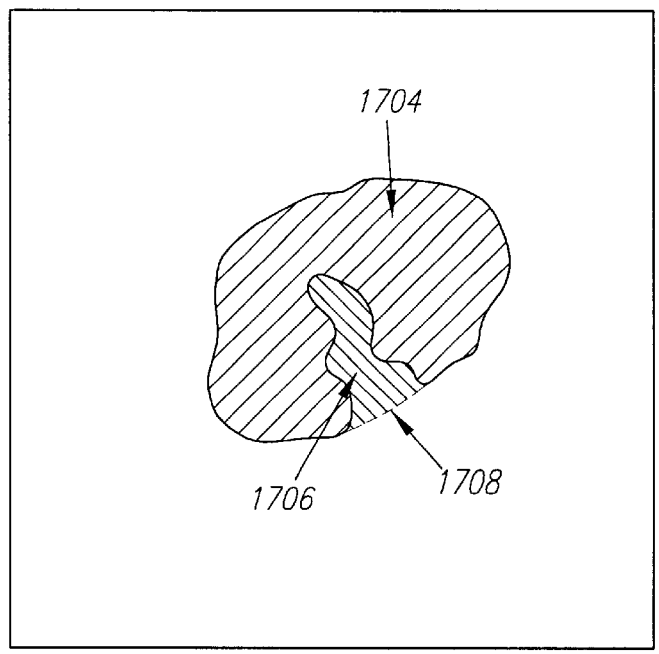
FIG. 17B depicts an example of a gene expression spot in a window of a microarray, in which the expression signal for the spot does not completely surround an intensity hole.

Another quality measurement that is preferably factored into any calculation of confidence is spot area. Spot area differs from signal area in that spot area includes signal pixels and non-signal pixels that are located inside a predominantly signal region. FIGS. 17A–B depict two examples distinguishing between spot area and signal area. In FIG. 17A, the signal area includes only the region labeled 1700. The spot area includes both regions 1700 and 1702. Similarly, in FIG. 17B, the signal area includes only region 1704, while the spot area includes both regions 1704 and 1706. Unlike FIG. 17A, in FIG. 17B, region 1706 is not completely surrounded by a signal region. Region 1706 is, in part, defined by a segment 1708 that make the signal region appear more circular. The spot area, and additionally, its ratio relationship to the signal area is a signal quality measure that is potentially an indicator of spotting problems in the array fabrication step 204. For example, a spot area that is significantly larger than the corresponding signal area may indicate a hole in the signal as shown in FIG. 17A that is often caused by problems with the shape of an arrayer pin, having an excessive amount of salt in the deposition solution, or problems with the chemistry of the slide. Such issues are preferably factored into any confidence evaluation of a particular signal measurement while, at the same time, serving a quality control function for the overall microarray process 100.

Another quality measure that is preferably factored into a confidence determination for the output measurements and preferably additionally serves as a quality control measure for the overall microarray process 100 is ellipticity or the degree to which the signal region has the shape of an ellipse versus a circle. To make this geometric property measurement, the length of the signal region's major and minor axes are preferably determined. This measure both indicates the signal's deviation from the desired circle and the potential that the signal's elliptical shape is due to a problem in the array fabrication process 204. For example, an elliptically shaped signal is potentially due to a directional airflow over the surface of the arrayer slide that causes the sample solution to spread in one or more directions on the slide surface. Alternatively, an elliptical shape may be due to a slide that is not positioned horizontally or is uneven.

To aid in narrowing the potential causes for an elliptically shaped signal and thereby refine the contribution to the confidence determination that is subsequently calculated, the orientation of the ellipse is also determined. In particular, by calculating elliptical signal orientation, the likelihood that directional airflow may be the cause of an elliptical signal can be more precisely determined. For example, if other signals on the slide have the same orientation, directional airflow becomes a more likely cause. Conversely, if an elliptical signal's orientation is an isolated occurrence, then the cause may be more likely a local anomaly such as an artifact on the slide surface.

Another geometric property measure that is preferably calculated is the square perimeter-to-spot area ratio. This measure is suggestive of a spot's deviation from a circle and is preferably normalized to the measure's value for a circle. Because spots are preferably designed to be circular in shape, higher values for this measure preferably have a negative effect on the ultimate confidence values.

The properties of contamination regions that may be present in a signal window are also preferably calculated and incorporated into the confidence calculation for the signal. One property is the area of the contamination region. Larger areas of contamination preferably result in lower confidence values for an associated signal, and to some degree, the integrity of the signal generally may become questionable.

Another confidence measure is the difference in the average intensity for pixels in contamination regions versus the signal regions. This measure broadly indicates the confidence in the signal segmentation step 504 to distinguish between signal and contamination regions for a spot. Smaller differences between the average intensities preferably result in lower confidences in their corresponding signal measurements.

Certain geometric properties of the sub-grids are also determined to support confidence measure determinations and provide further quality control indicators for the overall microarray process 100. One such property is the deviation of a spot's center location from its spot's canonic location. This measure is calculated by determining for each spot the distance between its grid point established by the automatic sub-grid detection step 501 and the spot's center, by calculating a centroid location for the spot, or optionally, using the spot center value determined in the circle localization step 502. In confidence calculations for a signal measurement, larger differences preferably lower the confidence value to the extent that they indicate distortion in the spot placement, the existence of contamination, or an error in the performance of the automatic sub-grid detection step 501.

A quality measure that evaluates sub-grids more generally is degree of alignment between sub-grids (sub-grid alignment). This measure determines the degree to which a row or column of sub-grids are in alignment with each other. Preferably, measures of sub-grid alignment are for pairs of sub-grids that are adjacent to each other either in the same row or the same column. For example, for two sub-grids in the same column, sub-grid alignment is preferably determined by first calculating the median of the distances between columns in both sub-grids. Second, the median of the offsets between the corresponding columns in the sub-grids is calculated. Finally, the sub-grid alignment value is determined by the ratio of the median of the distances between columns to the median of the offsets. The sub-grid alignment calculation is the same for adjacent sub-grids in the same row except that median calculations are applied to successive rows rather than successive columns. A determined sub-grid alignment value is potentially indicative of a pin printing error during the array fabrication step 204, or may be indicative of the errors in the performance of the automatic sub-grid detection step 501. For sub-grid alignment values greater than 0.5, a problem in one of these two areas likely exists. For sub-grid alignment values greater than 0.3, a closer inspection of the results of the process may be required. Generally, however, the values are preferably factored into signal confidence determinations.

Another global quality measure associated with sub-grid analysis is the uniformity in the distance between sub-grids. Sub-grid distance uniformity is a measure of the regularity of the distance between corresponding rows or between corresponding columns of two or more sub-grids. In a preferred embodiment, sub-grid distance uniformity is calculated by first determining the median of the distances between corresponding rows of adjacent sub-grids in the same column or corresponding columns of two adjacent sub-grids in the same row. A median distance value is therefore found for each pair of adjacent sub-grid in the microarray. The median of the set of median distance values for the pairs of sub-grids is then determined as a global median. Finally, sub-grid distance uniformity is determined by the median distance value that has the largest absolute deviation from the global median. By calculating the sub-grid pair with the largest deviation, the calculation provides a clear warning of at least one sub-grid that is not in its expected location. Like grid alignment, sub-grid distance uniformity is potentially indicative of pin printing problems such as a bent pin in the arrayer 408 or an error in the performance of the automatic sub-grid detection step 501. Furthermore, values for sub-grid distance uniformity are preferably factored into confidence measure determinations for measured signals.

Another set of quality measures concerns the variation in the identified background. Locally, the background variation is the standard deviation in the intensity of background pixels for each window. Higher standard deviations are potentially indicative of dust or other contamination on the local area of the window or possibly artifacts in the underlying glass or substrate. A measure of background variation is also determined for the entire microarray. To make this global determination of background variation, preferably the mean of the background for each signal window is first determined. Then, the standard deviation of the accumulated background means is determined. A higher result for the standard deviation is indicative of variation or non-uniformity in large regions of the background. A likely cause of such non-uniformity is one or more large areas of contamination such as when fluorescent molecules on the slide outside a spot well become trapped between the slide and another plate, and are spread across the slide surface. Another potential cause is an error during the scanning of the microarray into a digital image. The measure of global background variation is an indicator or such an occurrence and is preferably considered in any confidence calculations.

Another determination is whether any of the sub-grids in the digital image of the microarray appear to be missing. Indications of one or more missing sub-grids suggest a contact problem associated with one or more pins of the arrayer 408 such as would be the case if a pin is bent or missing. The determination that a sub-grid is missing may also indicate an error in the automatic sub-grid detection step 501.

Another signal quality measurement measures the parallelism of rows and of columns of sub-grids. Such is measured by preferably calculating a slope for each sub-grid line in the microarray and then calculating the standard deviation of the slopes. This calculation is preferably performed for all rows and for all columns. Similarly, the orthogonality between the rows and columns of the sub-grids is determined. Orthogonality is preferably calculated by measuring the angle of the sub-grid lines at each sub-grid point intersection and determining the standard deviation of the measured angles. The measurement of both parallelism and orthogonality are indicative of potential errors in the automatic sub-grid detection step 501 or pin placement errors during array fabrication 204.

Preferably, a set of monitoring calculations is performed as an additional quality control measure for the microarray process. The monitoring calculations include determining the intensity range and standard deviation for spots of the same known signal intensity that are inserted in the microarray image. Furthermore, the microarray images are monitored by calibrating the intensity using a series of control spots at different intensity values and reporting the variances.

The various signal quality measures, while being applied to identify potential concerns in prior steps of the overall microarray process 100 or in one of the prior steps of the image analysis process 212, also preferably are combined into a function or system for determining a confidence value for each measured gene expression signal. The function may be one that is heuristically obtained based on the performance and analysis of previous results. Alternatively, the various measures are included as input nodes to an artificial neural network that refines initial functional relationships between the signal quality measures. Preferably, the confidence value is a percentage from 0 to 100 reflecting the system's confidence in the obtained signal measurement.

Although the present invention has been described with reference to preferred embodiments, it will be readily appreciated to those of ordinary skill in the art that many modifications and adaptations of the invention are possible without departure from the spirit and scope of the invention as claimed hereinafter.

What is claimed is:

1. A system for assessing chemical materials manifested as an array of signals, the array being a grid of a plurality of sub-grids of the chemical materials, said system comprising:

a memory storing a digital image of the array; and a processor for accessing the digital image from said memory, detecting in the digital image a center-representing pixel and an approximate radius of a signal of a chemical material, segmenting the signal, and calculating a measure of the segmented signal;

said processor segmenting the signal for the chemical material by classifying pixels within the approximate radius of the center-representing pixel as tentative signal pixels and outside the approximate radius from the center-representing pixel as tentative background pixels, determining a signal major mode for the tentative signal pixels and a background major mode for the tentative background pixels, and using pixel intensity relative to the signal major mode and the background major mode to reclassify the tentative signal and background pixels.

2. The system of claim 1 further comprising a scanner for scanning the array and outputting the digital image of the array into said memory.

3. The system of claim 1 further comprising an arrayer, the arrayer depositing the chemical material on a slide to form the array.

4. The system of claim 1, said processor selecting between classifications of contamination, signal, background and undetermined in reclassifying the tentative signal and tentative background pixels.

5. The system of claim 4, said processor finally classifying as contamination pixels the undetermined pixels that are not spatially directly adjacent to a signal pixel and are not spatially adjacent to a signal pixel via other undetermined pixels.

6. The system of claim 4, said processor finally classifying as signal pixels the undetermined pixels that are not spatially directly adjacent to a contamination pixel, that are not spatially adjacent to a contamination pixel via other undetermined pixels, and that are either directly or via other undetermined pixels adjacent to a signal pixel.

7. The system of claim 4, said processor finally classifying the undetermined pixels that are spatially adjacent to both a region of contamination pixels and a region of signal pixels as signal pixels where the number of pixels in the region of contamination pixels is less than a predetermined fraction of the number of pixels in the region of signal pixels, and as contamination pixels where the number of pixels in the homogeneous region of contamination pixels is at least the predetermined fraction of the number of pixels in the homogeneous region of signal pixels.

8. The system of claim 7, the predetermined fraction of the number of pixels in the region of signal pixels being about one-third.

9. The system of claim 1, said processor determining a major mode for the tentative signal pixels and a major mode for the tentative background pixels by generating a signal intensity histogram from the tentative signal pixels and a background intensity histogram from the tentative background pixels, identifying a peak bin above the median pixel intensity in the signal intensity histogram and a peak bin below the median intensity in the background intensity histogram, selecting for each histogram a set histogram bins with pixels numbers greater than a predetermined fraction of the number of pixels in the peak bin, removing from the set of histogram bins for each histogram, histogram bins that are not in a connected group of histogram bins that includes the peak bin, calculating a slope on each side of the peak bin for the connected group of histogram bins in each histogram, fitting a slope line on each side of the peak bin for the connected group of histogram bins in each histogram, and identifying intersection histogram bins that intersect one of the slope lines in each histogram, the major mode for each histogram being the histogram bins between the intersect histogram bins.

10. The system of claim 9, the predetermined fraction of the number of pixels in the peak bin being about seven-tenths.

11. The system of claim 1, the chemical materials being nucleic acid species and the array of signals being a microarray of signals associated with the nucleic acid species.

12. The system of claim 1, said processor determining a measure of performance at detecting in the digital image a center-representing pixel and an approximate radius of a signal of a chemical material, segmenting the signal, and calculating a measure of the segmented signal.

13. The system of claim 12, said processor determining the measure of performance by measuring a spot area for the signal.

14. The system of claim 13, said processor determining another measure of performance by comparing the spot area to an area of the signal.

15. The system of claim 12, said processor determining the measure of performance by determining an ellipticity of the signal.

16. The system of claim 15, said processor determining another measure of performance by determining an orientation of the ellipticity of the signal.

17. The system of claim 12, said processor determining the measure of performance by determining a degree of deviation of the signal from a circle.

18. The system of claim 12, said processor determining the measure of performance by determining an area of contamination in a window around the segmented signal.

19. The system of claim 12, said processor determining the measure of performance by comparing an intensity measure for the signal with an intensity for contamination in a window around the signal.

20. The system of claim 12, said processor determining the measure of performance by measuring a variation in the background major mode.

21. A method of assessing chemical materials manifested as an array of signals, comprising the steps of:
   (a) detecting in the digital image a center-representing pixel and an approximate radius of a signal of a chemical material;
   (b) segmenting the signal; and
   (c) assessing the segmented signal; the step of segmenting the signal comprising the steps of:
      (ba) classifying pixels within the approximate radius of the center-representing pixel as tentative signal pixels and outside the approximate radius from the center-representing pixel as tentative background pixels;
      (bb) determining a signal major mode for the tentative signal pixels and a background major mode for the tentative background pixels; and
      (bc) using pixel intensity relative to the signal major mode and the background major mode to reclassify the tentative signal and background pixels.

22. The method of claim 21 further comprising a step of generating the digital image of the array.

23. The method of claim 21 further comprising the step of depositing the chemical material on a slide to form the array.

24. The method of claim 21, the tentative signal and background pixels being reclassified by selecting between classifications of contamination, signal, background and undetermined.

25. The method of claim 24, further comprising the step of finally classifying as contamination pixels the undetermined pixels that are not spatially directly adjacent to a signal pixel and are not spatially adjacent to a signal pixel via other undetermined pixels.

26. The method of claim 24, further comprising the step of finally classifying as signal pixels the undetermined pixels that are not spatially directly adjacent to a contamination pixel, that are not spatially adjacent to a contamination pixel via other undetermined pixels, and that are either directly or via other undetermined pixels adjacent to a signal pixel.

27. The method of claim 24, further comprising the step of finally classifying the undetermined pixels that are spatially adjacent to both a region of contamination pixels and a region of signal pixels
   as signal pixels where the number of pixels in the region of contamination pixels is less than a predetermined fraction of the number of pixels in the region of signal pixels, and
   as contamination pixels where the number of pixels in the homogeneous region of contamination pixels is at least the predetermined fraction of the number of pixels in the homogeneous region of signal pixels.

28. The method of claim 27, the predetermined fraction of the number of pixels in the region of signal pixels being about one-third.

29. The method of claim 21, wherein the step of determining a signal major mode for the tentative signal pixels and a background major mode for the tentative background pixels comprises the steps of:
   (bb1) generating a signal intensity histogram from the tentative signal pixels and a background intensity histogram from the tentative background pixels;
   (bb2) identifying a peak bin above the median pixel intensity in the signal intensity histogram and a peak bin below the median intensity in the background intensity histogram;
   (bb3) selecting for each histogram a set histogram bins with pixels numbers greater than a predetermined fraction of the number of pixels in the peak bin;
   (bb4) removing from the set of histogram bins for each histogram, histogram bins that are not in a connected group of histogram bins that includes the peak bin;
   (bb5) calculating a slope on each side of the peak bin for the connected group of histogram bins in each histogram;
   (bb6) fitting a slope line on each side of the peak bin for the connected group of histogram bins in each histogram; and
   (bb7) identifying intersection histogram bins that intersect one of the slope lines in each histogram, the major mode for each histogram being the histogram bins between the intersect histogram bins.

30. The method of claim 29, the predetermined fraction of the number of pixels in the peak bin being about seven-tenths.

31. The method of claim 21, the chemical materials being nucleic acid species and the array of signals being a microarray of signals associated with the nucleic acid species.

32. The method of claim 21, further comprising the step of determining a measure of performance at detecting in the digital image a center-representing pixel and an approximate radius of a signal of a chemical material, segmenting the signal, and calculating a measure of the segmented signal.

33. The method of claim 32, wherein the step of determining the measure of performance comprises measuring a spot area for the signal.

34. The method of claim 33, wherein the step of determining the measure of performance comprises comparing the spot area to an area of the signal.

35. The method of claim 32, wherein the step of determining the measure of performance comprises determining an ellipticity of the signal.

36. The method of claim 35, wherein the step of determining the measure of performance comprises determining an orientation of the ellipticity of the signal.

37. The method of claim 32, wherein the step of determining the measure of performance comprises determining a degree of deviation of the signal from a circle.

38. The method of claim 32, wherein the step of determining the measure of performance comprises determining an area of contamination in a window around the segmented signal.

39. The method of claim 32, wherein the step of determining the measure of performance comprises comparing an intensity measure for the signal with an intensity for contamination in a window around the signal.

40. The method of claim 32, wherein the step of determining the measure of performance comprises measuring a variation in the background major mode.

41. A computer readable medium having stored therein one or more sequences of instructions for assessing chemical materials manifested as an array of signals in a digital image, said one or more sequences of instructions causing one or more processors to perform a plurality of acts, said acts comprising:
   detecting in the digital image a center-representing pixel and an approximate radius of an signal of a chemical material;

segmenting the signal; and calculating a measure of the segmented signal;

wherein the signal is segmented by classifying pixels within the approximate radius of the center-representing pixel as tentative signal pixels and outside the approximate radius from the center-representing pixel as tentative background pixels, determining a signal major mode for the tentative signal pixels and a background major mode for the tentative background pixels, and using pixel intensity relative to the signal major mode and the background major mode to reclassify the tentative signal and background pixels.

42. The computer readable medium of claim 41, wherein said acts further comprise selecting between classifications of contamination, signal, background and undetermined in reclassifying the tentative signal and tentative background pixels.

43. The computer readable medium of claim 41, wherein said acts further comprise finally classifying as contamination pixels the undetermined pixels that are not spatially directly adjacent to a signal pixel and are not spatially adjacent to a signal pixel via other undetermined pixels.

44. The computer readable medium of claim 41, wherein said acts further comprise finally classifying as signal pixels the undetermined pixels that are not spatially directly adjacent to a contamination pixel, that are not spatially adjacent to a contamination pixel via other undetermined pixels, and that are either directly or via other undetermined pixels adjacent to a signal pixel.

45. The computer readable medium of claim 41, wherein said acts further comprise finally classifying the undetermined pixels that are spatially adjacent to both a region of contamination pixels and a region of signal pixels as signal pixels where the number of pixels in the region of contamination pixels is less than a predetermined fraction of the number of pixels in the region of signal pixels and as contamination pixels where the number of pixels in the region of contamination pixels is at least the predetermined fraction of the number of pixels in the region of signal pixels.

46. The computer readable medium of claim 45, the predetermined fraction of the number of pixels in the homogeneous region of signal pixels being about one-third.

47. The computer readable medium of claim 41, wherein said act of determining a signal major mode for the tentative signal pixels and a background major mode for the tentative background pixels is performed by generating a signal intensity histogram from the tentative signal pixels and a background intensity histogram from the tentative background pixels, identifying a peak bin above the median pixel intensity in the signal intensity histogram and a peak bin below the median intensity in the background intensity histogram, and selecting for each histogram a connected set of histogram bins that includes the peak bin that corresponds to the major mode for each histogram.

48. The computer readable medium of claim 47, wherein the selection of a connected set histogram bins for each histogram is performed by selecting for each histogram a set of histogram bins with pixels numbers greater than a predetermined fraction of the number of pixels in the peak bin, removing from the set of histogram bins for each histogram, histogram bins that are not in a connected group of histogram bins that includes the peak bin, calculating a slope on each side of the peak bin for the connected group of histogram bins in each histogram, fitting a slope line on each side of the peak bin for the connected group of histogram bins in each histogram, and identifying intersection histogram bins that intersect one of the slope lines in each histogram, the major mode for each histogram being the histogram bins between the intersect histogram bins.

49. The computer readable medium of claim 48, the predetermined fraction of the number of pixels in the peak bin being about seven-tenths.

50. The computer readable medium of claim 41, the chemical materials being nucleic acid species and the array of signals being a microarray of signals associated with the nucleic acid species.

51. The computer readable medium of claim 41, wherein said acts further comprise determining a measure of performance at detecting in the digital image a center-representing pixel and an approximate radius of a signal of a chemical material, segmenting the signal, and calculating a measure of the segmented signal.

52. A method of segmenting a signal of a chemical material in a digital image comprising the steps of:

(a) detecting in the digital image a center-representing pixel and an approximate radius of the signal;

(b) classifying pixels within the approximate radius of the center-representing pixel as tentative signal pixels and outside the approximate radius from the center-representing pixel as tentative background pixels;

(c) determining a signal major mode for the tentative signal pixels and a background major mode for the tentative background pixels; and (d) using pixel intensity relative to the signal major mode and the background major mode to reclassify the tentative signal and background pixels.

53. The method of claim 52, the tentative signal and background pixels being reclassified by selecting between classifications of contamination, signal, background and undetermined.

54. The method of claim 53, further comprising the step of finally classifying as contamination pixels the undetermined pixels that are not spatially directly adjacent to a signal pixel and are not spatially adjacent to a signal pixel via other undetermined pixels.

55. The method of claim 53, further comprising the step of finally classifying as signal pixels the undetermined pixels that are not spatially directly adjacent to a contamination pixel, that are not spatially adjacent to a contamination pixel via other undetermined pixels, and that are either directly or via other undetermined pixels adjacent to a signal pixel.

56. The method of claim 53, further comprising the step of finally classifying the undetermined pixels that are spatially adjacent to both a region of contamination pixels and a region of signal pixels as signal pixels where the number of pixels in the region of contamination pixels is less than a predetermined fraction of the number of pixels in the region of signal pixels, and as contamination pixels where the number of pixels in the homogeneous region of contamination pixels is at least the predetermined fraction of the number of pixels in the homogeneous region of signal pixels.

57. The method of claim 56, the predetermined fraction of the number of pixels in the region of signal pixels being about one-third.

58. The method of claim 52, wherein the step of determining a signal major mode for the tentative signal pixels and a background major mode for the tentative background pixels comprises the steps of:

(ca) generating a signal intensity histogram from the tentative signal pixels and a background intensity histogram from the tentative background pixels;

(cb) identifying a peak bin above the median pixel intensity in the signal intensity histogram and a peak bin below the median intensity in the background intensity histogram; and (cc) selecting for each histogram a connected set of histogram bins that includes the peak bin that corresponds to the major mode for each histogram.

59. The method of claim 58, wherein the step of selecting for each histogram a connected set of histogram bins that includes the peak bin that corresponds to the major mode for each histogram comprises the steps of:

(cc1) selecting for each histogram a set of histogram bins with pixels numbers greater than a predetermined fraction of the number of pixels in the peak bin;

(cc2) removing from the set of histogram bins for each histogram, histogram bins that are not in a connected group of histogram bins that includes the peak bin;

(cc3) calculating a slope on each side of the peak bin for the connected group of histogram bins in each histogram;

(cc4) fitting a slope line on each side of the peak bin for the connected group of histogram bins in each histogram; and (cc5) identifying intersection histogram bins that intersect one of the slope lines in each histogram, the major mode for each histogram being the histogram bins between the intersect histogram bins.

60. The method of claim 59, the predetermined fraction of the number of pixels in the peak bin being about seven-tenths.

61. The method of claim 52, the chemical materials being nucleic acid species and the array of signals being a microarray of signals associated with the nucleic acid species.

62. The method of claim 52, further comprising the step of determining a measure of performance at detecting in the digital image a center-representing pixel and an approximate radius of a signal of a chemical material, segmenting the signal, and calculating a measure of the segmented signal.

* * * * *